(12) United States Patent
Boyes et al.

(10) Patent No.: US 10,583,922 B1
(45) Date of Patent: Mar. 10, 2020

(54) SWAPPABLE AVIONICS FOR UNMANNED AERIAL VEHICLE

(71) Applicant: Amazon Technologies, Inc., Seattle, WA (US)

(72) Inventors: Craig Boyes, Redmond, WA (US); Nicholas Kristofer Gentry, Seattle, WA (US); Walker Chamberlain Robb, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 567 days.

(21) Appl. No.: 15/385,669

(22) Filed: Dec. 20, 2016

(51) Int. Cl.
  *B64C 1/22* (2006.01)
  *B64C 39/02* (2006.01)
  (Continued)

(52) U.S. Cl.
  CPC .............. *B64C 39/024* (2013.01); *B64C 1/22* (2013.01); *B64C 27/08* (2013.01); *B64D 43/00* (2013.01); *B64D 43/02* (2013.01); *B64D 45/00* (2013.01); *B64D 47/08* (2013.01); *B64C 2201/024* (2013.01); *B64C 2201/027* (2013.01); *B64C 2201/108* (2013.01); *B64C 2201/128* (2013.01); *B64C 2201/165* (2013.01); *B64C 2211/00* (2013.01); *B64D 2013/0614* (2013.01); *B64D 2045/0065* (2013.01); *B64D 2045/0085* (2013.01)

(58) Field of Classification Search
  CPC .......... B64D 43/00; B64D 43/02; B64C 1/22; B64C 27/08
  USPC ...................................................... 244/17.11
  See application file for complete search history.

(56) References Cited

U.S. PATENT DOCUMENTS

| | | | |
|---|---|---|---|
| 3,640,492 A | * | 2/1972 | Star ........................ B64D 45/00 244/124 |
| 4,736,910 A | * | 4/1988 | O'Quinn ............... B64C 1/0009 244/118.2 |

(Continued)

OTHER PUBLICATIONS

Office Action for U.S. Appl. 15/385,748, dated May 15, 2019, Boyes, "Unmanned Aerial Vehicle Configuration and Deployment", 6 pages.

(Continued)

*Primary Examiner* — Claude J Brown
(74) *Attorney, Agent, or Firm* — Lee & Hayes, P.C.

(57) ABSTRACT

A configurable unmanned aerial vehicle (UAV) may include swappable avionics that may be selectable for use with other UAV components to build a customized UAV just prior to deployment of the UAV that is configured to deliver a package to a destination. Various factors may be involved in the selection of the avionics, such as an availability of different avionics, payload requirements (size, weight, etc.), environmental conditions along an anticipated route of flight, a region of use of the UAV, compatibility, a distance of the flight, power considerations, security considerations, and/or other factors. The avionics may include various hardware and/or software which may provide control output (e.g., data, power, and/or mechanical) to other components and/or systems, including a propulsion system. Coupling devices may selectively couple the avionics to other components of the UAV, such as to a battery, a cargo bay or package, and/or to a propulsion system.

20 Claims, 13 Drawing Sheets

(51) Int. Cl.
*B64C 27/08* (2006.01)
*B64D 47/08* (2006.01)
*B64D 43/02* (2006.01)
*B64D 45/00* (2006.01)
*B64D 43/00* (2006.01)
*B64D 13/06* (2006.01)

(56) References Cited

U.S. PATENT DOCUMENTS

| | | | |
|---|---|---|---|
| 8,660,712 B2 * | 2/2014 | Grabowsky | B64C 3/56 |
| | | | 701/3 |
| 9,731,821 B2 * | 8/2017 | Hoareau | G05D 1/102 |
| 9,786,187 B1 | 10/2017 | Bar-Zeev et al. | |
| 10,071,803 B2 * | 9/2018 | Hoareau | B64D 1/02 |
| 2007/0086158 A1 * | 4/2007 | Hartung | H05K 7/20563 |
| | | | 361/690 |
| 2011/0084162 A1 * | 4/2011 | Goossen | B64C 39/024 |
| | | | 244/12.1 |
| 2011/0174931 A1 * | 7/2011 | Berland | B64D 17/025 |
| | | | 244/152 |
| 2014/0032034 A1 | 1/2014 | Raptopoulos et al. | |
| 2014/0131510 A1 | 5/2014 | Wang et al. | |
| 2014/0180914 A1 * | 6/2014 | Abhyanker | G01C 1/00 |
| | | | 705/39 |
| 2014/0330456 A1 | 11/2014 | Lopez Morales et al. | |
| 2015/0301528 A1 * | 10/2015 | Fredriksson | A63H 30/04 |
| | | | 701/2 |
| 2017/0069214 A1 | 3/2017 | Dupray et al. | |
| 2017/0081028 A1 * | 3/2017 | Jones | B64C 39/024 |
| 2017/0118873 A1 * | 4/2017 | Szarek | H01R 27/02 |
| 2017/0174091 A1 | 6/2017 | Miller et al. | |
| 2017/0247120 A1 | 8/2017 | Miller | |
| 2017/0283090 A1 | 10/2017 | Miller et al. | |
| 2017/0291704 A1 * | 10/2017 | Alegria | B64C 39/022 |
| 2017/0300855 A1 | 10/2017 | Lund et al. | |
| 2018/0058864 A1 | 3/2018 | Lection et al. | |
| 2018/0244404 A1 | 8/2018 | Park | |
| 2019/0100314 A1 * | 4/2019 | Prager | B66C 1/38 |

OTHER PUBLICATIONS

Non-Final Office Action for U.S. Appl. No. 15/385,748, dated Nov. 16, 2018, Boyes, "Unmanned Aerial Vehicle Configuration and Deployment," 16 pages.

* cited by examiner

SWAPPABLE AVIONICS FOR UNMANNED AERIAL VEHICLE

BACKGROUND

Many aircraft include sophisticated avionics, which include many sensors, processors, software, electronics, and other components to enable successful control of the aircraft. The avionics are hardwired in aircraft and directly interface with many external sensors and external electronic systems of the aircraft. The avionics are tailored to a particular aircraft to accommodate interaction with the particular aircraft's hardware and other systems using preconfigured communication protocols. In addition, these avionics are often tuned to specific flight capabilities of the aircraft that the avionics are deployed in. For example, avionics may be tuned to a specific aircraft having known flight capabilities to enable avoidance of a stall, warnings related to threshold maneuvers, and so forth.

Unmanned aerial vehicles (UAVs) may use different propulsion systems, different avionics, different power sources, and different sensors depending on an intended use of the UAVs. For example, to perform a specific task, a fleet manager may select a particular UAV that is ideal to perform this task while considering the different configurations of UAV available to the fleet manager. To enable use of an optimized UAV, the fleet manager must have multiple different UAVs available from which to select. This may require a large fleet of UAVs, which may be cost prohibitive to some organizations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4A shows a cargo bay with a door in a closed position while FIG. 4B shows the cargo bay with the door in a partially open position.

DETAILED DESCRIPTION

Figure 1:
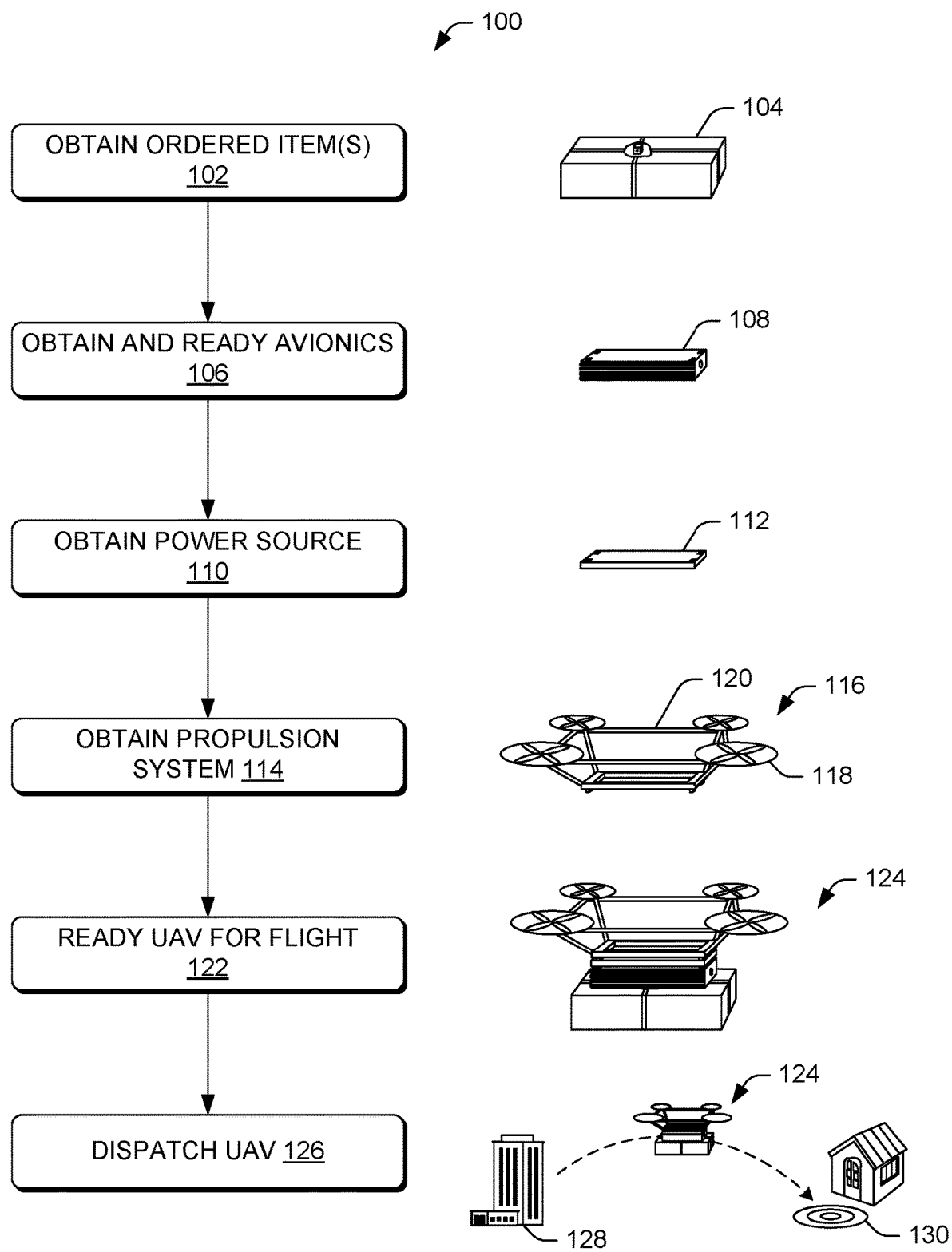
FIG. 1 is a pictorial flow diagram of an illustrative process to configure a UAV with an illustrative avionic system prior to flight of the UAV.

This disclosure is directed to a configurable unmanned aerial vehicle (UAV) that includes swappable avionics that may be selectable for use with other UAV components for a specific operation and to build a customized UAV, such as to execute a specific flight plan to deliver a package to a destination. For example, the UAV may be custom configured just before a flight by selecting appropriate avionics for a flight plan to be executed by the UAV. Various factors may be involved in the selection of the avionics, such as an availability of different avionics, environmental conditions along an anticipated route of flight, a region of use of the UAV, compatibility, a distance of the flight, power considerations, security considerations, and/or other factors.

The avionics may include various hardware and/or software which may provide control output (e.g., data, power, and/or mechanical) to other components and/or systems, including a propulsion system. The propulsion system may include propulsion units that each include a rotor, a speed controller, and a motor, for example. The propulsion system may include a frame for coupling the propulsion units to one another. The avionics system, when in communication with the propulsion system, may cause independent operation of the propulsion units to navigate the UAV in accordance with a flight plan. The avionics may include various internal avionics components, such as a navigation system, a propulsion controller, a power manager, a health monitor, a data logger, radios, and/or other components to control the UAV and/or for ancillary purposes.

In some embodiments, the avionics may be plugged into or otherwise securely inserted into a slot or cavity of the propulsion system, such as into a fuselage of the propulsion system, while retaining an ability to quickly decouple from the propulsion system after a flight. The avionics may connect to a dock or other standard port interface to exchange power, data, and/or mechanical interaction with the propulsion system, a battery, and/or a cargo bay. In various embodiments, the avionics may operate as part of a frame of the UAV, which may couple to the propulsion system, a cargo bay, a battery, and/or other components. For example, during assembly, the avionics may be selected to perform a particular flight plan. After selection of the avionics, other components (e.g., the propulsion system, the cargo bay, the battery, etc.) may be coupled to the avionics or to one another to form an operable and flight-ready UAV to execute the flight plan.

The avionics may be selected for a flight plan at a fulfillment center just prior to deploying the UAV. For example, the avionics may be selected based on a receipt of an order or request for a delivery of an item. The UAV may be assembled or configured with the avionics at the fulfillment center, and then deployed to deliver the item or items to one or more destinations before returning to the fulfillment center (or another location) to await redeployment, possibly in a different configuration and/or using different avionics.

The apparatuses, systems, and techniques described herein may be implemented in a number of ways. Example implementations are provided below with reference to the following figures.

FIG. 1 is a pictorial flow diagram of an illustrative process 100 to configure a UAV with illustrative avionic prior to flight of the UAV. The process 100 may be performed at a fulfillment center that receives orders of items and dispatches UAVs to deliver the items to destinations associated with specific orders.

At 102, one or more items may be obtained for delivery to a destination. For example, an order may be received at the fulfillment center that includes inventory to fulfill the order or at least a portion of the order. Items may be gathered from the fulfillment center by workers, robots, or both to fulfill the order. The items may be added to a container 104 (e.g., a cargo bay, a package, etc.) and may await transport by a UAV to the destination.

At 106, avionics 108 may be selected and obtained from different available avionics based on delivery information associated with the order. For example, a system may generate a flight plan to be used to deliver the items to the destination. The avionics 108 may be selected to enable successful completion of the flight plan. For example, the flight plan may include flight at certain altitudes, through certain environmental conditions, for a specific distance, to carry a known payload (e.g., weight, size, etc.) and so forth. The avionics may be selected to at least meet or exceed criteria to successfully execute the flight plan. At 106, the avionics may be readied to execute the flight plan, such as by loading flight information, navigation waypoints, a destination address, and/or other instructions to memory in the avionics, as well as possibly charging an avionics power source and/or performing other tasks to ready the avionics for use.

At 110, a power source 112 may be selected and obtained to power the UAV. The power source 112 may be a battery or battery pack having a power capacity to power the UAV to complete the flight plan. In some embodiments, the power source 112 may include a fuel, such as a solid or liquid fuel that is consumed during propulsion of the UAV. The power source may act as a primary or secondary power source for the avionics 108. For example, the avionics 108 may include a dedicated battery to perform basic operations, and may draw power from the power source 112 to power the propulsion units of the UAV.

At 114, a propulsion system 116 may be selected and obtained for the UAV and for use with the avionics 108. The propulsion system 116 may include propulsion units 118 coupled together by a frame 120. The propulsion units 118 may each include a motor that powers a rotor and a speed controller that regulates the power and speed of rotation of the rotor. In some embodiments, the propulsion system 116 may be configured as a rotor-craft. In various embodiments, the propulsion system 116 may be configured as a forward flight aircraft. In still further embodiments, the propulsion system 116 may be configured as a hybrid aircraft that can sustain hover flight and forward flight supported by an upward lift produced by at least one wing. In various embodiments, the propulsion system 116 may be selected prior to the selection of the power source 112 at the operation 110 and/or prior to selection of the avionics 108 at the operation 106. In fact, any different order of the operations 106, 110, and 114 may be used in the process 100. In addition, a determination of which components to physically select may be performed following the operation 102, and may determine the components individually or all at once.

At 122, a UAV 124 may be assembled and readied for flight to execute the flight plan and deliver the item(s) to the destination(s). For example, the flight plan may include multiple legs where each leg (or segment) is for a different delivery location associated with a different order. Thus, the flight plan may accommodate fulfilling multiple orders by performing multiple legs during the flight. In some embodiments, the avionics 108 and the power source 112 may be coupled to the propulsion system 116. For example, the propulsion system 116 may include cavities (or slots) to receive and selectively secure the avionics and/or battery, such as in a fuselage. In various embodiments, the avionics 108 may couple to the battery and may couple to the propulsion system 116, directly or indirectly to form the UAV 124. The container 104 may be secured to the UAV 124 or may be formed as part of the avionics and/or as part of the propulsion system (e.g., part of a fuselage, etc.), in accordance with some embodiments. In various embodiments, some of the components of the UAV may be assembled after obtaining a component. For example, the power source 112 may be coupled to the avionics 108 after obtaining the power source 112 and prior to obtaining the propulsion system 116.

At 126, the UAV 124 may be dispatched from a fulfillment center 128 to execute the flight plan to deliver the item(s) to a destination 130 and/or to other destinations. In some embodiments, the process 100 may be performed along an assembly line or other sequenced operation to assemble the UAV just prior to dispatch of the UAV at the operation 126. Thus, the UAV may be assembled using components on-hand at the fulfillment center, or other location, that can perform the flight plan. When not in use, the components may be stowed, under inspection, being charged, powered, serviced, and/or replenished, and/or otherwise maintained for an impending use. The order of selection described in the process 100 is not limiting, and may be performed in a different order to enable use of the avionics 108 that are configured for use with different batteries and/or different propulsion systems.

Figure 2:
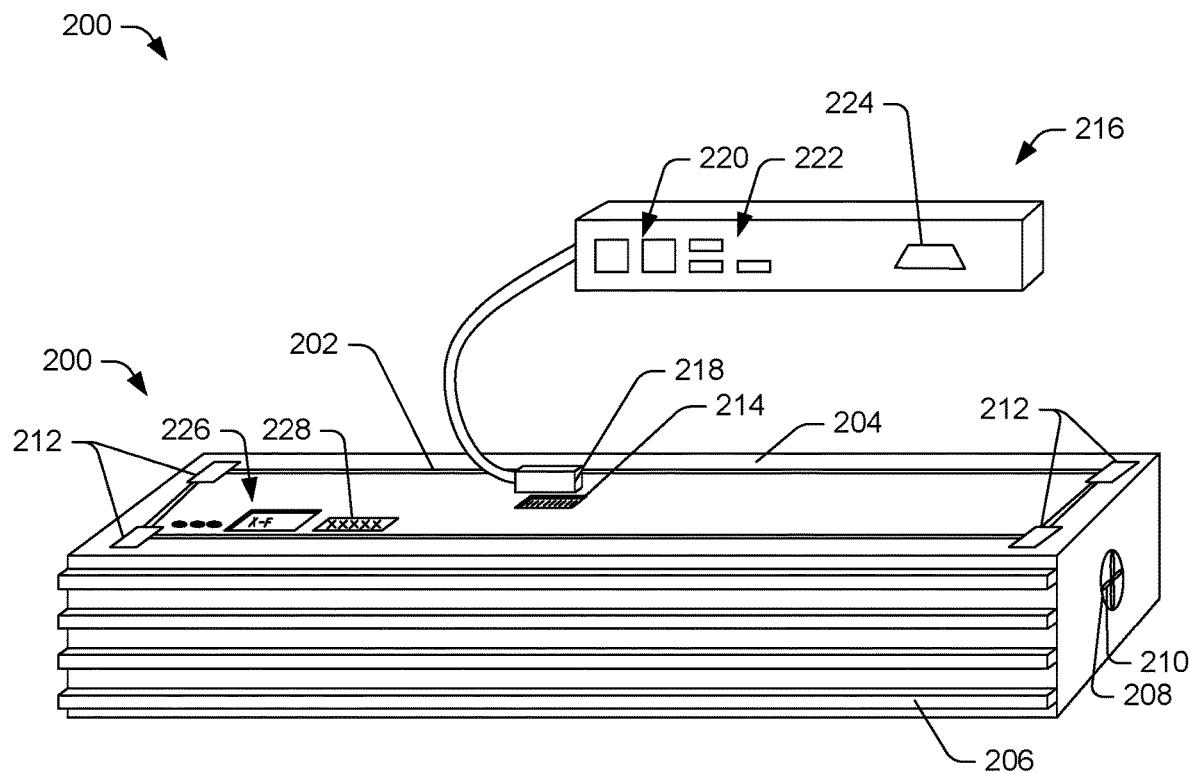
FIG. 2 is a perspective view of illustrative swappable avionics.

FIG. 2 is a perspective view of illustrative swappable avionics 200. The avionics 200 may include a frame 202 (or harness) that supports a housing 204 to enclose various avionics components which are shown and described with reference to FIGS. 3 and 4. In some embodiments, the frame 202 may be configured as an airframe for a UAV, and may support coupling of various components that impose various forces on the frame 202 under load, such as during transport of a package via flight of an assembled UAV. The frame 202 may be at least partially enclosed by the housing 204, which may protect internal avionics components from the environment, such as from water, from debris, and/or from contact with other outside elements. The housing 204 may be formed of a material selected to resist impact forces and/or tampering that may damage internal components. For example, the housing 204 may be formed of carbon fiber, aluminum, titanium, steel, or a reinforced polymer. In some embodiments, the housing may be resistant against heat, water, outside air, and/or other elements.

The avionics 200 may include one or more heating, venting, and air conditioning (HVAC) components to regulate temperature inside of the housing 204. For example, the avionics components may generate heat, which may be removed and/or dissipated by fins 206, a vent 208, and/or other HVAC components, which may include a fan 210. The vent 208 may include an internal shaft or aperture, which may include heat-extracting elements such as fins, louvers, and/or other elements that act as part of a heat sink to remove heat from internal components. Thus, the internal components may not be exposed to airflow through the vent 208. The internal components may be coupled to fins or other features to draw or extract heat from the components and move the heat to the heat-extracting elements. The airflow through the vent 208 may be caused by the fan 210, by movement of the UAV through air (e.g., via ram air), from rotor wash from a propulsion unit or multiple propulsion units, and/or from other air movement mechanisms. Heating elements may also be included in the HVAC in some embodiments to heat the avionics, such as for avionics to be deployed in very cold environments such as in outer space or in artic conditions. Heating elements may be located internally inside the housing of the avionics 200, when present.

The avionics 200 may include one or more couplers 212, which may selectively couple the avionics to another component, such as to the propulsion system, the battery, the cargo bay, and/or to another component. The coupler(s) 212 may toggle between a first position that engages another component and a second position that is disengaged from the other component. In some embodiments, the couplers 212 may be static (e.g., without moving parts) and may be selectively engaged by other coupling features on the propulsion system, the battery, or on another component. The couplers 212 may be coupled to the frame 202. In various embodiments, the couplers 212 may be located about the avionics 200 to enable engagement with a corresponding coupler when the avionics 200 are inserted into a cavity, such as into a fuselage of the propulsion system or other frame. In some embodiments, the couplers 212 may securely lock to a corresponding component and may unlock after receipt of a physical key or electronic key, such as a key available at a fulfillment center that receives the UAV that includes the avionics 200. By locking, the couplers may prevent unauthorized remove of the avionics from the UAV.

The avionics 200 may include one or more ports 214 to enable unidirectional or bidirectional flow of data, power, and/or mechanical controls. In some embodiments, the ports 214 may be centralized to enable a single connection to the ports by a connector, such as a dock of the propulsion system, the battery, or another component. However, multiple ports may be located on different sides of the avionics. The ports 214 may project through the housing 204 and enable data or power flow to/from the avionics, possibly through a port that is compliant with IP67 or other environmental standards. In some embodiments, the couplers 212 may include the ports 214 to enable transfer of power, data, and/or mechanical controls via a same point in the avionics. Thus, coupling the data/power to the avionics may also secure the avionics in a location with respect to the battery and/or the propulsion system, for example.

In some embodiments, an adapter 216 may be selectively coupled to the data ports 214 to enable exchange of data and/or to provide power to the avionics. For example, the adapter 216 may be coupled to the avionics after receipt of the avionics at a fulfillment center after the avionics return from a flight with a UAV. The adapter 216 may enable accessing data stored in the avionics, charging an internal battery, loading a next flight plan, updating software, debugging, and/or providing other data to the avionics 200 or accessing other data from the avionics 200. The adapter 216 may include a first interface 218 to couple to (e.g. plug into) the ports 214. The adapter 216 may include various standard ports for coupling standard connectors, such as GBE ports 220, USB ports 222, and/or CAN Debug/Programming ports 224, among other possibly ports. The data stored in the avionics may be secured using encryption and/or other techniques to prevent unauthorized extraction of the data and/or manipulation of the data, including reprogramming the avionics for use by another unauthorized party.

In various embodiments, the avionics 200 may include one or more output devices 226, such as light emitting diodes (LEDs), a display screen, and/or other output devices to provide information to a recipient or operator of the avionics 200, such as a service worker. The output may provide messages indicating error codes, a ready status of the avionics 200, operational states, and/or other information. The outputs may or may not be visible when the avionics 200 is coupled to the propulsion system and/or coupled to other components.

The avionics 200 may include a unique identifier 228 used to locate or track use of the avionics 200. The unique identifier 228 may be implemented as an alphanumeric code or an image code on the housing 204 of the avionics 200, and/or a radio frequency identifier (RFID) located within the housing 204, for example.

Figure 3:
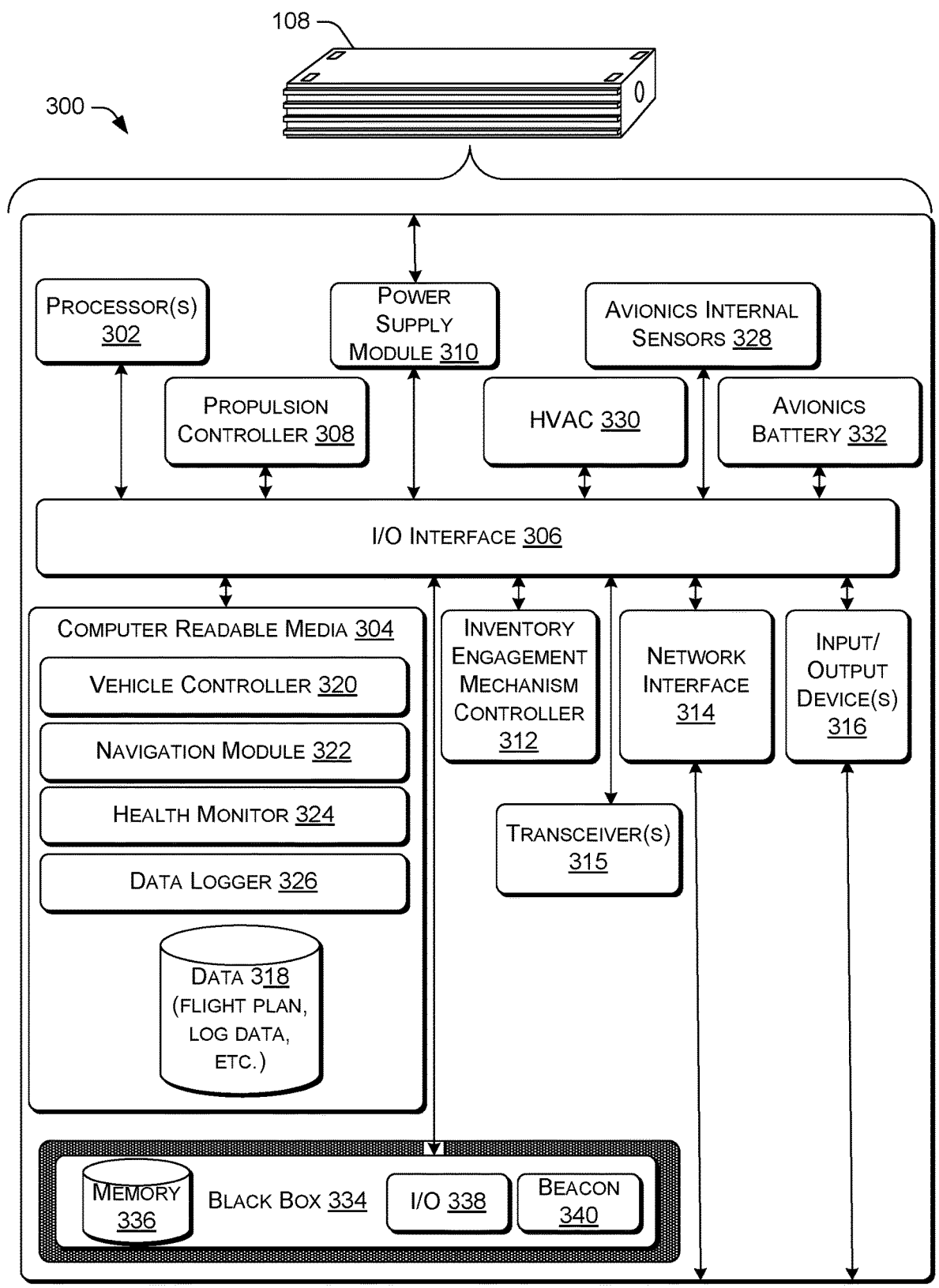
FIG. 3 is a block diagram of an illustrative avionics architecture.

FIG. 3 is a block diagram of an illustrative avionics architecture 300. The avionics architecture 300 may be used to implement the various systems, devices, and techniques discussed herein. In the example implementation, the avionics architecture 300 includes one or more processors 302, coupled to a non-transitory computer readable media 304 via an input/output (I/O) interface 306. The avionics architecture 300 may also include a propulsion controller 308 configured to detect a type of the propulsion system (e.g., based in identification information, etc.), determine attributes (e.g., number of rotors, center of gravity, etc.) and to control operation and output the propulsion system 116. The avionics architecture 300 may include a power supply module 310 configured to control operation of the power source 112. The power supply module 310 may control the charging and any switching functions associated with the power supply 112 (e.g., batteries) of the UAV.

The avionics architecture 300 may further include an inventory engagement mechanism controller 312 to interact with the container 104 and thereby secure, release, open, and/or close the container 104 based on control logic. The inventory engagement mechanism controller 312 may communicate with an actuator(s) or motor(s) (e.g., a servo motor) used to engage and/or disengage inventory, such as via the container 104. For example, when the UAV 124 is positioned over or proximate to a delivery location, the inventory engagement mechanism controller 312 may provide an instruction to a motor that controls the inventory engagement mechanism to release an item from the container 104.

In some examples, the avionics architecture 300 also includes a network interface 314 configured to facilitate data communications between the avionics 108 and other devices attached to a network, such as, for example, the power source 112, the propulsion system 116, the container 104, and/or other computer systems, remote controllers, and/or other vehicle control systems of other UAVs. For example, the network interface 314 may enable wireless communication between numerous UAVs. In various implementations, the network interface 314 may support communication via wireless general data networks, such as a Wi-Fi network, a Bluetooth® network, and/or a wired network. In some examples, the network interface 314 may support communication via telecommunications networks such as cellular communication networks, satellite networks, and the like. The network interface 314 may enable transmission of information to/from one or more transceivers 315, such as mobile telephone radios, Wi-Fi radios, and/or other types of radios that send and receive data. In some embodiments, the transceivers 315 may include a radio frequency identifier (RFID) transmitter and/or receiver.

The avionics architecture 300 also includes one or more input/output devices 316, such as, for example, one or more displays, imaging devices, thermal sensors, infrared sensors, time of flight sensors, accelerometers, gyroscopes, pressure sensors, weather sensors, optical sensors, gimbals, landing gear, pitot tubes and/or other devices that may be used to assist operation of the UAV 124, and/or other input/output devices commonly used in aviation. Multiple input/output devices 316 may be present and controlled by the avionics architecture 300. Some of the input/output device 316 may be outward facing from the avionics 108 to enable data capture, such as imaging devices, the Pitot tube, and possibly other sensors. In some embodiments, other sensors may be fitted on other components of the UAV 124, such as the propulsion system 116, and may be controlled by the avionics via connections by one or more ports of the avionics that enables receipt or exchange of power and/or data.

In various implementations, the avionics architecture 300 may be implemented using a uniprocessor system including one processor 302, or a multiprocessor system including several processors 302 (e.g., two, four, eight, or another suitable number). The processor(s) 302 may be any suitable processor capable of executing instructions. For example, in various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 304 may be configured to store executable instructions/modules, data, flight paths, and/or data items accessible by the processor(s) 302, such as, for example, data 318. In various implementations, the non-transitory computer readable media 304 may be implemented using any suitable memory technology, such as static random access memory (SRAM), synchronous dynamic RAM (SDRAM), nonvolatile/flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 304 or the avionics architecture 300. Generally speaking, a non-transitory, computer readable memory may include storage media or memory media such as flash memory (e.g., solid state memory), magnetic or optical media (e.g., disk) coupled to the avionics architecture 300 via the I/O interface 306. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 314.

In one implementation, the I/O interface 306 may be configured to coordinate I/O traffic between the processor(s) 302, the non-transitory computer readable media 304, and any devices (external and/or internal) and/or sensors, the network interface 314 or other interfaces, such as input/output devices 316. In some implementations, the I/O interface 306 may perform any necessary protocol, timing or other data transformations to convert data signals from one component (e.g., non-transitory computer readable media 304) into a format suitable for use by another component (e.g., processor(s) 302). In some implementations, the I/O interface 306 may include support for devices attached through various types of peripheral buses, such as, for example, a variant of the Peripheral Component Interconnect (PCI) bus standard or the Universal Serial Bus (USB) standard. In some implementations, the function of the I/O interface 306 may be split into two or more separate components, such as, for example, a north bridge and a south bridge. Also, in some implementations, some or all of the functionality of the I/O interface 306, such as an interface to the non-transitory computer readable media 304 may be incorporated directly into the processor(s) 302.

In some embodiments, the computer readable media 304 may store various components such as a vehicle controller 320, a navigation module 322, a health monitor 324, and a data logger 326. The components may access and/or write data 318, which may include flight plan data, log data, destination data, image data, and object data, and so forth. The components are described in turn.

The vehicle controller 320 may control general operation of the UAV 124, such as to control vehicle attitude. The vehicle controller 320 may provide instructions to the various motors of the propulsion system (possibly by providing power at different power levels) to control the UAV 124, such as to maintain flight, turn, rotate, move in a particular direction and/or perform other typical flight operations including takeoff, landing, and hover flight (for rotor-craft). Thus, the vehicle controller 320 may provide instruction and/or power setting to sustain continued flight.

The navigation module 322 may provide instructions to the vehicle controller to cause the aircraft to execute a particular flight plan. The navigation module 322 may execute the flight plan such as by identifying waypoints using a global positioning system (GPS), using computer vision by identifying landmarks and/or other objects, and/or receiving controls to cause the aircraft to proceed along a given path. The navigation module 322 may also perform object avoidance, such as by leveraging computer vision information, transmissions from other objects, and/or other information to cause the vehicle controller to cause the aircraft to avoid obstacles, such as buildings, other aircraft, birds, antennas, wires/cables, and so forth.

The health monitor 324 may monitor health of the avionics and/or other systems of the UAV (e.g., the propulsion system 116, the battery 112, etc.) via use of various sensors, including avionics internal sensors 328. The avionics sensors 328 may include temperature sensors, humidity sensors, accelerometers, and/or other sensors that may indicate an overall health or integrity of the avionics 108. The health monitor 324 may use information obtained from the avionics internal sensors 328 to control the health of the avionics, such as to activate or modify use of heating, ventilation, and air conditioning (HVAC) 330 components to regulate temperature of the avionics, for example. In some embodiments, the health monitor 324 may indicate when the avionics is ready for use, such as when an avionics battery 332 is charged and the data 318 is uploaded with a current flight plan. The avionics battery 332 may power some or all of the avionics in the absence of availability of the power source 112, such as prior to coupling of the power source 112 to the avionics 108. The health monitor 324 may indicate service requirements for the avionics based on events captured by the avionics internal sensors 328 (e.g., signals indicating threshold values for vibration, heat, etc.), cycles of use, and/or for other reasons. The health monitor 324 may cause output on the output devices 226, such as the LEDs or display screen to enable an operator to take action (move the avionics to a service center, etc.).

The data logger 326 may log data during operation of the avionics, including control data, navigation data, health data, and/or other data, which may be used to determine service of the avionics or other components of the UAV 124, among other uses. In some embodiments, the data generated by the data logger 326 may be used to determine errors, faults, or other unexpected actions or events experienced by the avionics, such as when the avionics are damaged due to a crash. The data logger 326 may store information in the data 318.

In some embodiments, the avionics 108 may include a black box 334, which may include memory 336 and an input/output (I/O) device 338 to access the memory 338. The data logger 326 may write data to the memory 336 via the I/O device 338, which may be protected via isolation hardware of the black box 334 designed to protect the memory 336 in the event of a crash or other unintended action. The I/O device 338 may operate to access information stored in the memory 336. In some embodiments, the black box 334 may include a beacon 340 that may broadcast a signal to enable location of the avionics in the event of loss of communication by the transceivers, possibly as a result of a crash. The black box 334 may include a protective layer to further protect the data stored in the black box in the event of damage to the UAV or to the avionics 200.

The avionics may further include security to prevent or thwart tampering or modification of the avionics. For example, the housing of the avionics may include a tamper guard, while the data 318 may be encrypted, for example. In some embodiments, some or all of the components in the avionics may be shielded from interference from other components and/or mounted on a suspension to minimize or reduce vibrations of the components. The avionics may be designed to be buoyant, such as via use of an airtight chamber to contain the internal components.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the avionics architecture 300 is merely illustrative and is not intended to limit the scope of the present disclosure. In particular, the computing system and devices may include any combination of hardware or software that can perform the indicated functions, including computers, network devices, etc. The avionics architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated avionics architecture 300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the avionics architecture 300 may be transmitted to the avionics architecture 300 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the avionics architecture 300 is discussed below.

Figure 4A:
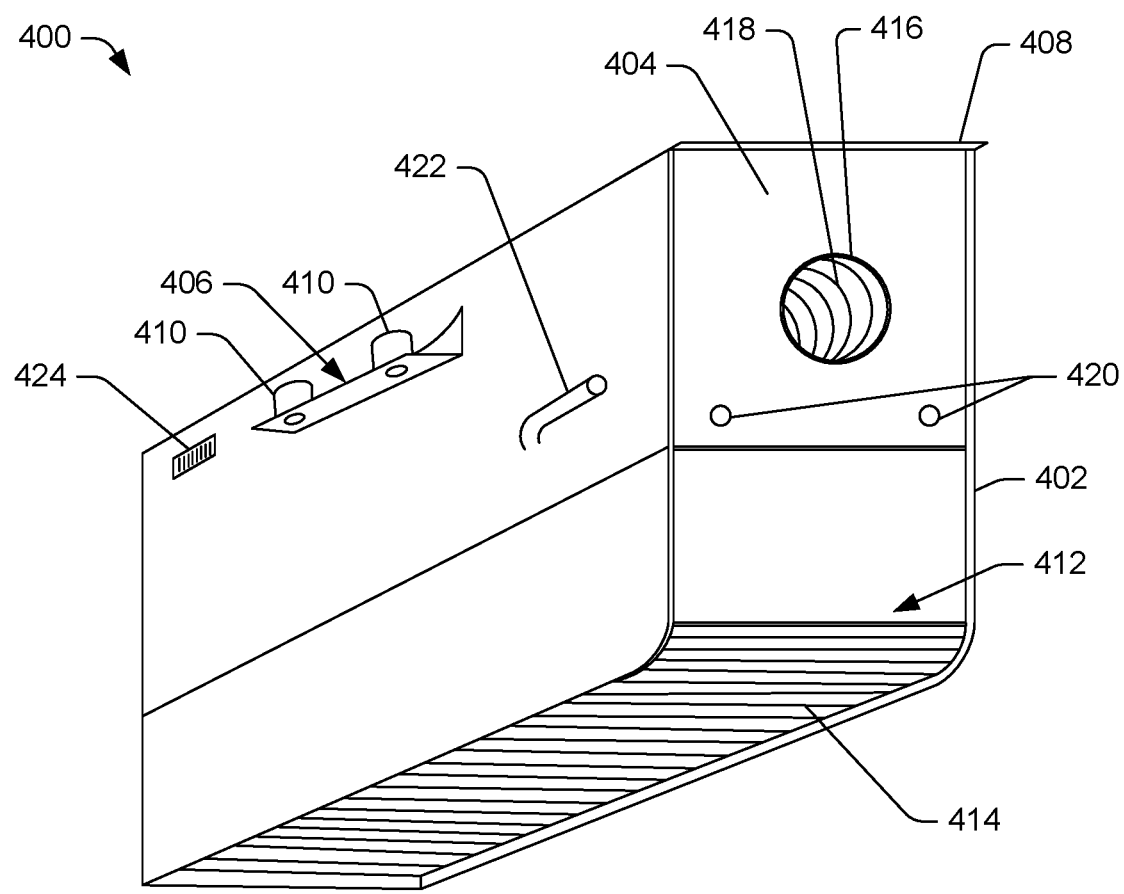
FIGS. 4A and 4B are a perspective view of another configuration of illustrative swappable avionics.

FIG. 4A is a perspective view of another configuration of illustrative avionics 400. The avionics 400 may include a frame 402 and housing 404. The frame 402 may be internal to the housing or may project through the housing 404 at certain points, such as points or locations of couplers, such as a coupler 406. The housing 404 may protect internal components from exposure to water, debris, and/or otherwise may isolate internal components. In some embodiments, the housing 404 may form a fuselage of the UAV. For example, a prolusion system such as the propulsion system 116 may be coupled to the coupler 406 and/or to other couplers, such as edge features 408 (e.g., a bulkhead snap-in high cycle count connector, etc.) that may mate with a corresponding coupler of another component to selectively secure the avionics relative to another component. The coupler 406, and other couplers may include dampers 410 to reduce vibration exposure to the avionics caused by the propulsion system or by other components. In some embodiments, the couplers may also include ports.

The avionics 400 may include a cargo bay 412 to store items for delivery by the UAV. The cargo bay 412 may include a door 414 to retain the items. For example, the door 414 may be implemented as a rolling door, a sliding door, or another type of door to reveal access to the items. By opening the door 414 to a certain degree or amount, particular items may be added to the cargo bay 412 or removed from the cargo bay 412. For example, during flight, the door may open to a first position to enable dislodging a first item from the cargo bay for a first delivery, and then the door may open to a second position to dislodge a second item from the cargo bay for a second delivery.

The avionics 400 may include a cooling vent 416. The cooling vent 416 may include a shaft or aperture that extends at least partially into the housing, or possibly across the entire housing and exiting on an opposite side of the housing. The cooling vent 416 may enable airflow through the cooling vent 416 during movement of the UAV (e.g., by ram air caused by movement of the UAV in a particular direction). In some embodiments, the cooling vent 416 may receive air as a result of wash from rotors, via a fan that moves air through the vent, or by heat transfer (hot air causing movement of air in the vent). The cooling vent 416 may include features 418, such as louvers, fins, a mesh, a grid, or other features to assist in removing heat from within the avionics by way of a heat sink or similar heat removing device that is coupled to heat-generating interior components.

In some embodiments, the avionics 400 may include external facing sensors 420, such as image sensors. Different avionics may include different types of sensors and/or sensors at different locations about the avionics based on intended use of the avionics and/or other design considerations. For example, if the avionics 400 are optimized for flight at night, different types of sensors may be included than an avionics optimized for flight during daylight. The avionics 400 may include a pitot tube 422 to measure movement of air relative to the avionics, such as when the avionics 400 are used with a winged aircraft. The pitot tube 422 may be omitted for some avionics, such as avionics designed for use with rotor-craft that do not include wings.

The avionics 400 may include one or more ports 424 to enable unidirectional or bidirectional flow of data, power, and/or mechanical controls. In some embodiments, the ports 424 may be centralized to enable a single connection to the ports by a connector, such as a dock of the propulsion system, the battery, or another component. However, multiple ports may be located on different sides of the avionics 400. The ports 422 may project through the housing 404 and enable data or power flow to/from the avionics, possibly through a port that is compliant with IP67 or other environmental standards.

Figure 4B:
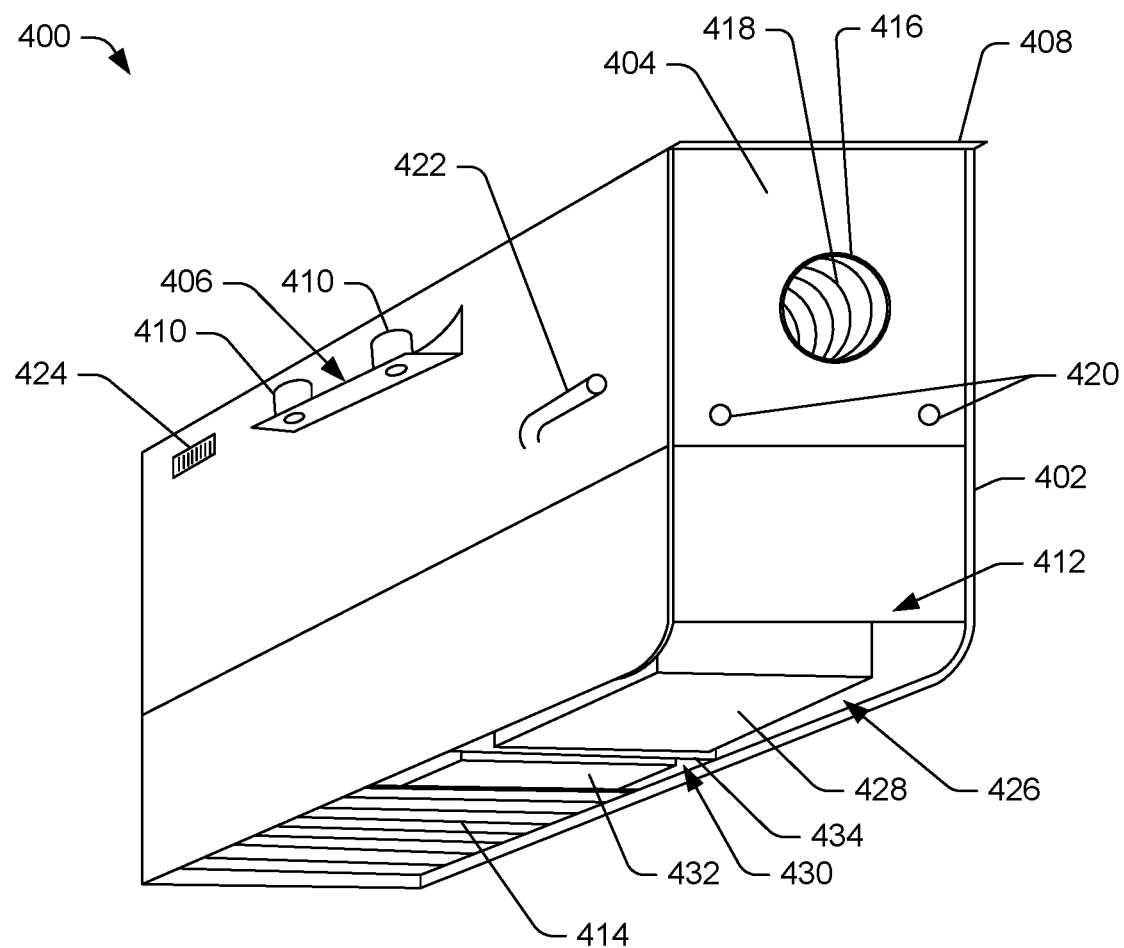

FIG. 4B shows the cargo bay 412 with the door 414 in an at least partially open position to expose an inside of the cargo bay 412 where packages may be placed and stored during transport to one or more delivery destinations. As described above, the cargo bay 412 may include the door 414 to retain the items. By progressively opening the door 414, particular items may be released from the cargo bay 412. For example, during flight, the door 112 may open to expose a first storage location 426 to enable release of a first item 428 from the cargo bay 412 at a first delivery destination. Later, the door 414 may open an additional amount to expose a second storage location 430 to enable release of a second item 432 from the cargo bay 412 at a second delivery destination. A divider 434 may create a physical barrier between the first storage location 426 and the second storage location 430. The cargo bay 412 may be loaded in an inverted orientation with respect to the orientation shown in FIG. 4A, and may be transported in the orientation shown in FIG. 4A during flight to allow items to be more easily dislodged from the cargo bay 412 at or near a delivery destination. The door 414 may be closed between destinations to protect the inside of the cargo bay from exposure to environmental conditions.

Figure 5A:
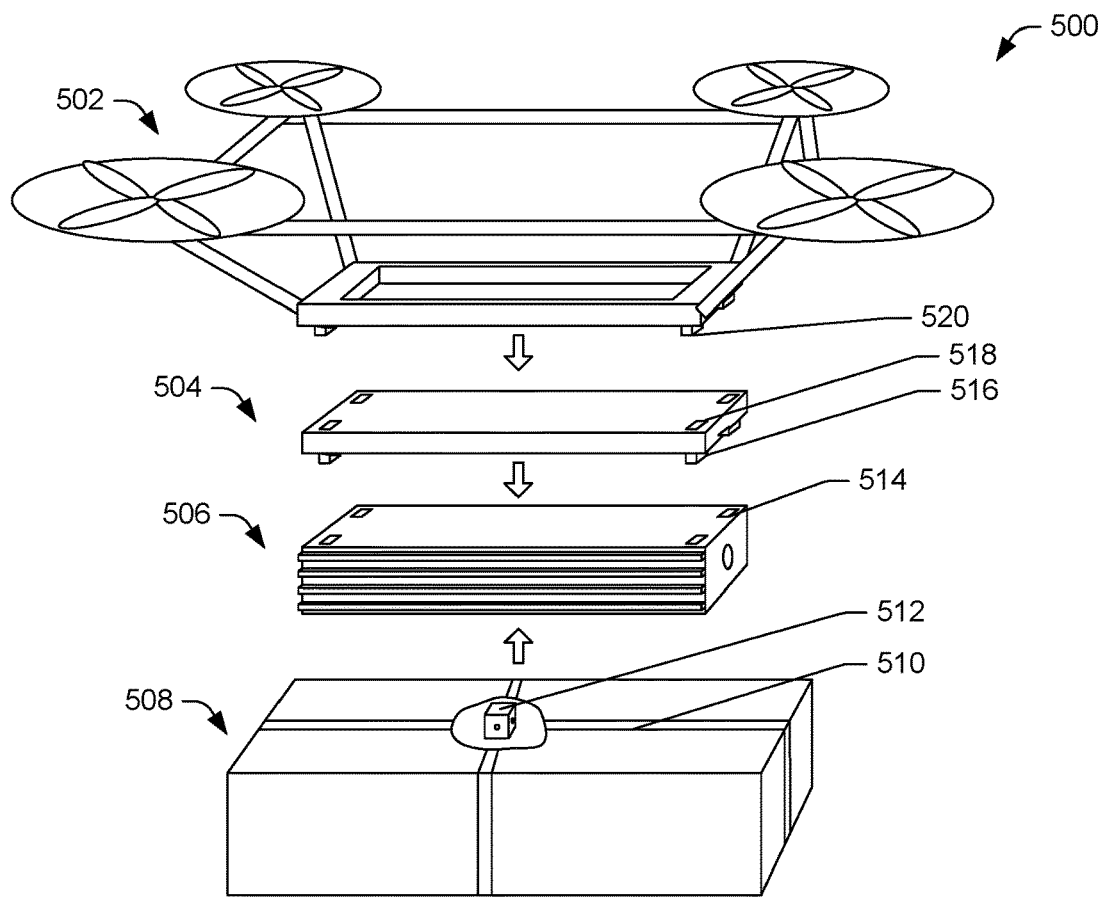
FIG. 5A shows a perspective view of an unassembled illustrative UAV that includes swappable avionics.

FIG. 5A shows a perspective view of an unassembled UAV 500 that includes swappable avionics. As shown the UAV 500 may include various components that may be decoupled from one another, such as prior to assembly at a fulfillment center. The components may include a propulsion system 502, a battery 504, avionics 506, and a container 508. The container 508 may be an item secured by a strap 510 and including a container coupler 512, a cargo bay, or another type of container, which may contain multiple items, for example.

As shown, the UAV 500 may couple together using various couplers shown in FIG. 5. For example, the UAV 500 may be assembled by snapping (or otherwise coupling) components together using couplers that can selectively lock together with other couplers, and then unlock or disengage in response to a mechanical or electrical control. The components of the UAV 500 may be selected and obtained based on items to be delivered (e.g., size, weight, etc.) and a type of delivery to be performed, which may be based on a flight plan for the UAV 500. The flight plan may include factors such as physical attributes (distance, temperature, elevation, etc.), and environmental attributes (amount of light, sensors needed, transmission frequencies, etc.), among other possible considerations.

In accordance with some embodiments, the avionics 506 may be selected based on the flight plan and/or other attributes of the delivery of item(s). The avionics 506 may include a first coupler to engage the container coupler 512 to secure the container 508 to the avionics 506. The avionics may include second couplers 514 to selectively couple to third couplers 516 of the battery 504 to secure the battery 504 to the avionics 506. The battery 504 may include fourth couplers 518 to selectively couple to fifth couplers 520 of the propulsion system 502 to secure the battery 504 to the propulsion system 502. The order of the coupling may depend on design considerations. For example, the battery 504 may be coupled to an opposite side of the avionics 506 as the propulsion system 502 in some embodiments. In various embodiments, the battery 504 may be coupled to a side of the avionics 506 or inserted into a slot or cavity in the avionics 506. As described, the UAV 500 may be custom built for a specific flight plan by selecting the avionics, the propulsion system, and the battery for coupling to build the UAV 500.

In some embodiments, the avionics may disengage or decouple from the container coupler 512 at or near a destination to allow the container 510 to be deposited at the destination. However, in various embodiments, such as when items are to be delivered to different destinations, the avionics may deposit individual items, such as by gradually opening a cargo bay door, or by other techniques such as releasing different package couplers.

Upon return to the fulfillment center, the UAV 500 may be disassembled, such as by decoupling the avionics 506 from the battery 504, the battery 504 from the propulsion system 502, and so forth. The parts may be inspected, serviced, charged, and/or otherwise readied for a subsequent deployment.

Figure 5B:
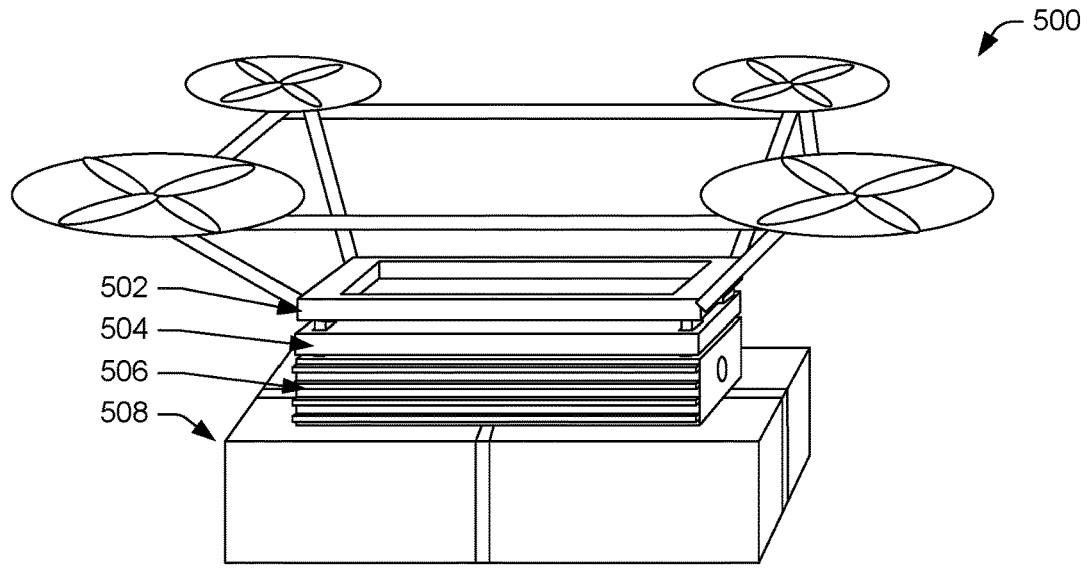
FIG. 5B shows a perspective view of the UAV from FIG. 5A after assembly in a flight-ready configuration.

FIG. 5B shows a perspective view of the UAV 500 from FIG. 5A after assembly in a flight-ready configuration. As shown in FIG. 5B, the various couplers are engaged in corresponding couplers to lock or otherwise secure the components together during operation of the UAV 500.

Figure 6A:
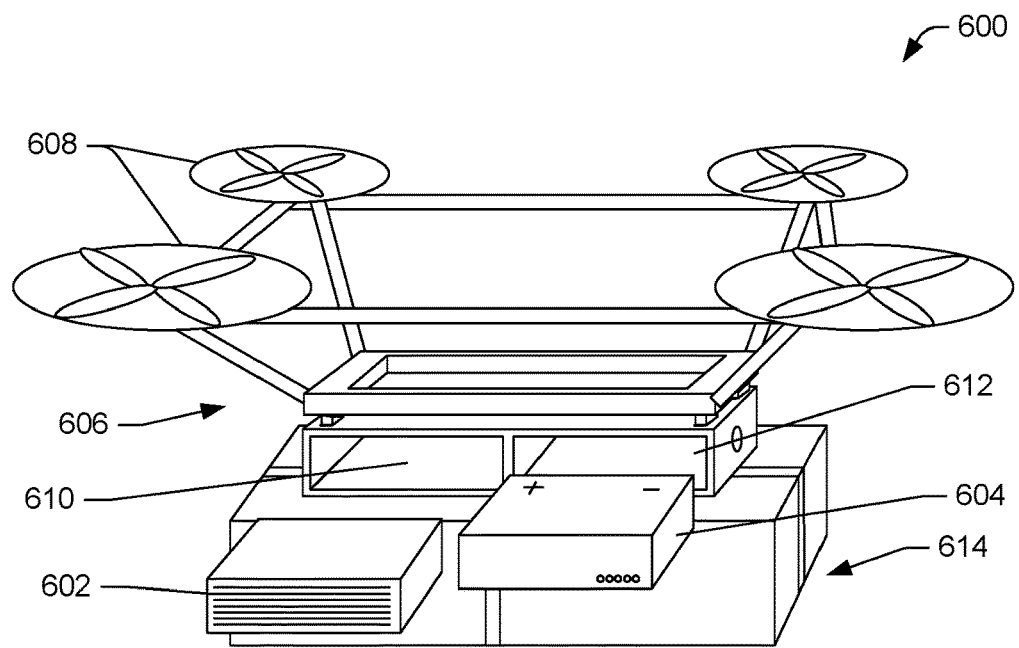
FIG. 6A shows a perspective view of an illustrative UAV that includes swappable avionics and battery ready to be installed in the UAV.
Figure 6B:
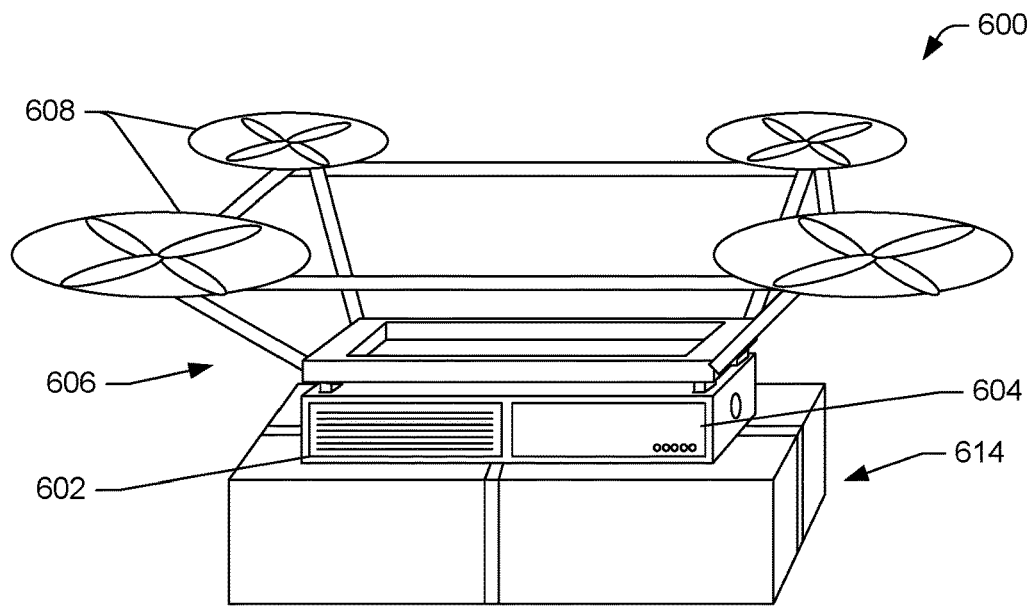
FIG. 6B shows a perspective view of the UAV from FIG. 6A after insertion of the avionics and battery in a flight-ready configuration.

FIG. 6A shows an illustrative UAV 600 that includes swappable avionics 602 and a battery 604. FIG. 6B shows a perspective view of the UAV 600 from FIG. 6A after insertion of the avionics 602 and battery 604 in a flight-ready configuration. Referring to FIG. 6A, the UAV 600 may include a chassis 606 (or frame) that supports propulsion units 608. The chassis 606 may include a first cavity 610 to receive the avionics 602 and a second cavity 612 to receive the battery 604. The avionics 602 and/or the first cavity 610 may include one or more couplers to selectively secure the avionics 602 in the chassis 606 during operation of the UAV 600, and allow removal of the avionics 602 after operation of the UAV 600 or at other times. The battery 604 and/or the second cavity 612 may include one or more couplers to selectively secure the battery 604 in the chassis 606 during operation of the UAV 600, and allow removal of the battery 604 after operation of the UAV 600 or at other times. The cavities 610 and 612 may accommodate different avionics and/or different batteries, enabling an operator to select appropriate avionics and appropriate battery or batteries for a particular flight plan to be performed by the UAV. Thus, the UAV 600 may be quickly custom-assembled for a specific flight plan by selecting the avionics and battery for insertion or coupling to the chassis 606. In some embodiments, the chassis 606 may include doors to close and cover the cavities 610 and/or 612, such as to protect the internal cavities from environmental conditions, dirt, etc. when the cavities are empty and/or after insertion of components into the cavities.

A container 614, such as a cargo bay, package, or other type of container may be coupled to the chassis 606. For example, a cargo bay may be located on a side of the chassis 606 that is opposite a side of the chassis 606 that includes the propulsion units 608. The cargo bay may stow items during transport to one or more destinations and may selectively deposit or release items at specific locations based on commands (data, mechanical controls, etc.) received by the cargo bay from the avionics 602.

Figure 7:
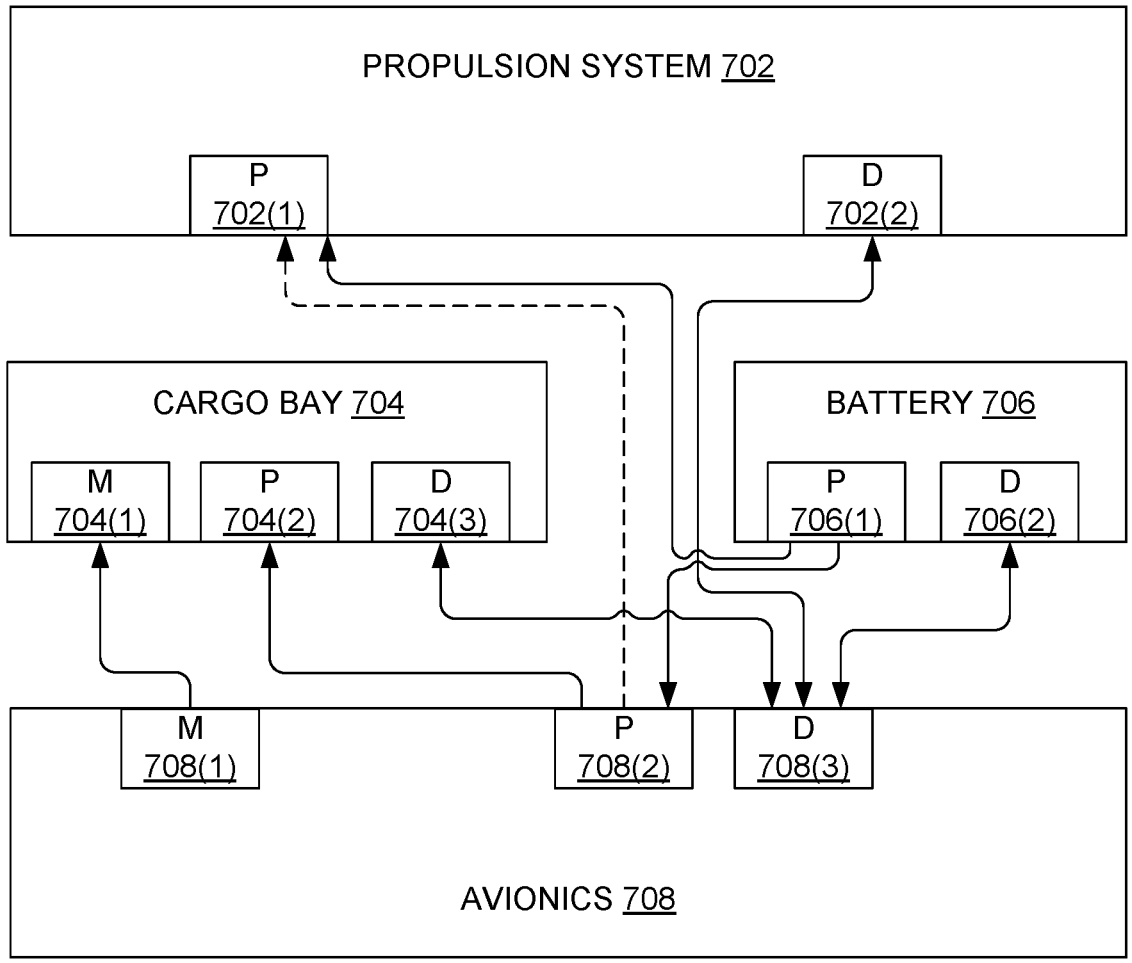
FIG. 7 is a schematic diagram showing various illustrative ports of a UAV that includes illustrative swappable avionics.

FIG. 7 is a schematic diagram showing various illustrative ports of a UAV 700, and illustrative connections between the various ports. The UAV 700 may include various components that include a propulsion system 702, a cargo bay 704, a battery 706, and avionics 708, which may be configured for assembly prior to flight of the UAV 700 based at least in part on a flight plan to be executed by the UAV 700. The various components of the UAV 700 may include data ports (D), power ports (P), and/or mechanical ports (M), as shown in FIG. 7.

The battery 706 may include a power port 706(1) that provides power to the avionics 708 via a power port 708(2) and to the propulsion system 702(1). The avionics 708 may then distribute power to the cargo bay 704 via power ports 704(2) to control the operation of the cargo bay (doors, couplers, actuators, and/or other devices) and/or provide general power to the components, which may be managed, at least in part, by logic onboard those components (possibly in response to data provided by the avionics by a data port 708(3). In some embodiments, the avionics 708 may distribute power to the propulsion system 702 via power ports 702(1) (shown with a dashed line) to control the operation of the propulsion units and/or provide general power to the components, which may be managed, at least in part, by logic onboard those components (possibly in response to data provided by the avionics by a data port 708(3)).

The avionics 708 may include the data port 708(3) that exchanges information with the battery 706 via a data port 706(2), exchanges information with the propulsion system 702 via a data port 702(2), and exchanges information with the cargo bay 704 via a data port 704(3). For example, the exchange may include data including operational instructions provided by the avionics 708 to components, and results, confirmation, and/or other data received by the avionics 708 from the components. When power is supplied to the propulsion system 702 directly from the battery 706, the data provided to the propulsion system 702 from the avionics 708 may provide inputs to speed controllers or other devices to control power usage by individual propulsion units, which enable directional control and controlled navigation of the UAV. As shown in FIG. 7, the data connections may be generally bi-directional. However, some data connections may be unidirectional when no reply data is provided from a component to the avionics 708.

The avionics 708 may include a mechanical connection with the cargo bay 704 to actuate the cargo bay, such as by actuating a door of the cargo bay, releasing the cargo bay, and/or providing other mechanical movement or interaction to the cargo bay to cause an intended result. For example, the mechanical connection may be implemented as a shaft that projects from the avionics 708 into the cargo bay 704 that moves (e.g., rotates, extends, etc.) to cause an intended result (e.g., release of an item from the cargo bay, etc.). However, other mechanical configurations may also be implemented to allow the avionics 708 to control other components, such as open a cargo door, eject the battery 706, eject the avionics 708 from the propulsion system 702, etc.

In some embodiments, the various ports may be integrated with couplers that couple the various components to one another. For example, the avionics 708 may be coupled to the propulsion system by couplers that also create a connection between the power ports 702(1) and 708(2) and create a connection between the data ports 702(2) and 708(3). Likewise, the avionics 708 may be coupled to the cargo bay 704 and the battery 706 by similar techniques and/or the battery 706 may be coupled to the propulsion system 702 via similar techniques. The avionics 708 may control decoupling of the various components in some embodiments, such as through output of data, output of a power signal (or lack of power), and/or by a mechanical output via the mechanical connector port 708(1). For example, upon return to the fulfillment center after completing a flight plan to deliver a package to a destination, the avionics 708 may receive a first signal to decouple the components. The avionics 708 may then transmit a second signal to the various components which may cause the components to decouple from one another.

FIGS. 8-12 show flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 8:
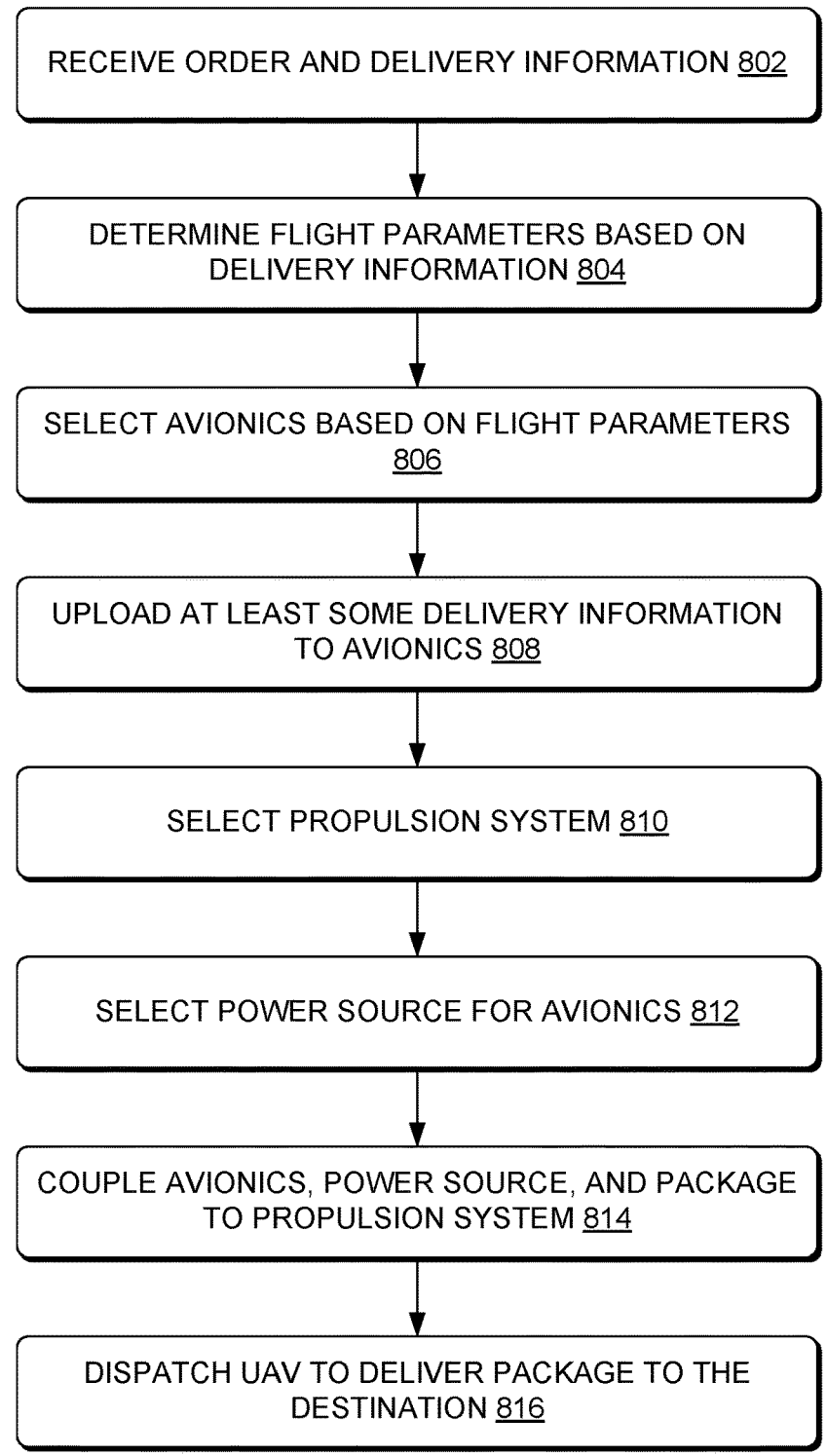
FIG. 8 is a flow diagram of an illustrative process to configure a UAV with an illustrative avionic system prior to flight of the UAV.

FIG. 8 is a flow diagram of an illustrative process 800 to configure a UAV with an illustrative avionic system prior to flight of the UAV. The process 800 may be performed in a fulfillment center or other area that is configured to assemble the UAV and outfit or otherwise load an item for transport by the UAV to a destination.

At 802, the fulfillment center may receive an order by a customer for one or more items. The order may include or be associated with delivery information, such as an address of the delivery location, a time range for completion of the delivery, and/or other attributes of the delivery, such as special handling request. This information may be used to obtain the items for the order, such as by picking the items from inventory at the fulfillment center. The items may be packaged for delivery or may be individually placed into a container or cargo bay for transport by a UAV, as discussed below.

At 804, flight parameters may be determined based on the delivery information provided at the operation 804. The flight parameters may include a flight plan, expected environmental and weather conditions, a time range of a flight, a weight payload and size payload of items to be transported by the UAV, and/or other relevant information that pertains to a flight of the UAV to deliver the item(s) of the order. In some embodiments, multiple deliveries may be performed by the UAV during a flight, and thus multiple orders may be combined to create different legs of a flight plan, which may be included in the flight information.

At 806, avionics may be selected from available different avionics for the flight. For example, a scheduler device may designate an available avionics for use to perform delivery of an item. Thus, the selection may not include physically obtaining the avionics at this operation. However, the avionics may be physically obtained at this operation as well. The selection of the avionics may be based on the flight plan and delivery information determined at the operation 804. The selected avionics may be avionics that can perform the flight plan, and yet have minimal additional capability or functionality, thereby preserving avionics with other capabilities for use for subsequently received orders. However, any avionics that meets minimum threshold criteria associated with the flight plan may be selected for use in a UAV to execute the flight plan.

At 808, at least some delivery information may be uploaded to the selected avionics to ready the avionics to perform the flight plan. The avionics may be readied by uploading data, such as map data, control data, inventory data, address information, weather information, payload information, and/or other relevant information or a portion thereof. Additional information may be uploaded to the avionics during flight or at other times using radio communications. The avionics may also be readied by charging an internal battery of the avionics and/or performing other services on the avionics, such as inspections, cleaning, etc. However, in some embodiments, all the delivery information may be uploaded via radio communications after the UAV is assembled or at other times (e.g., during flight, during assembly, etc.).

At 810, the propulsion system may be selected to propel the UAV to complete the flight plan. The propulsion system may be a type of rotor-craft, a forward flight aircraft, or a hybrid aircraft that include both hover and forward flight capabilities. The selection of the propulsion system may be based on a distance of the delivery, a size and weight of the payload, and/or other characteristics or attributes of the flight plan.

At 812, the power source for the UAV may be selected to power to UAV to complete the flight plan. For example, the power source may be a battery having a charged capacity to power the UAV through completion of the delivery and flight plan. In some embodiments, the charge of the battery may include a safety factor to provide more power capacity to the UAV than expected in case a need for more power arises, such as due to stronger than expected headwinds, object avoidance, and/or other unexpected events that cause the UAV to consume more power than expected. In some embodiments, the power source may include a solid or liquid fuel, which may be added to a fuel compartment of a UAV, such as to the propulsion system.

At 814, the UAV may be assembled by coupling the avionics, the power source, the propulsion system, and the item(s) of the order together to form the UAV. The coupling may be performed as described with reference to FIGS. 5A and/or 6A. For example, the different components may couple together, such as by snaps that selectively lock the components together. Some components may be inserted into cavities in other components, which may or may not be closed behind doors.

In some embodiments, the various components may be assembled at different stages, depending on the configuration of the UAV. For example, when the avionics 400 shown in FIG. 4A is selected, the item(s) may be placed in the cargo bay of the avionics early in processing, and possibly before selection of the propulsion unit and battery. The assembly of the UAV may occur along an assembly line or using other similar processes to assembly the UAV in stages while optimizing or attempting to optimize throughput of items/order from the fulfillment center.

At 816, the UAV may be dispatched just after assembly of the UAV to deliver the item(s) to the destination(s). Thus, a customized UAV having components specifically selected for the flight plan and delivery may be assembled and dispatched to execute the flight plan and perform the delivery. Upon return, the UAV may be disassembled and await another later deployment, possibly as a different configuration of components.

Figure 9:
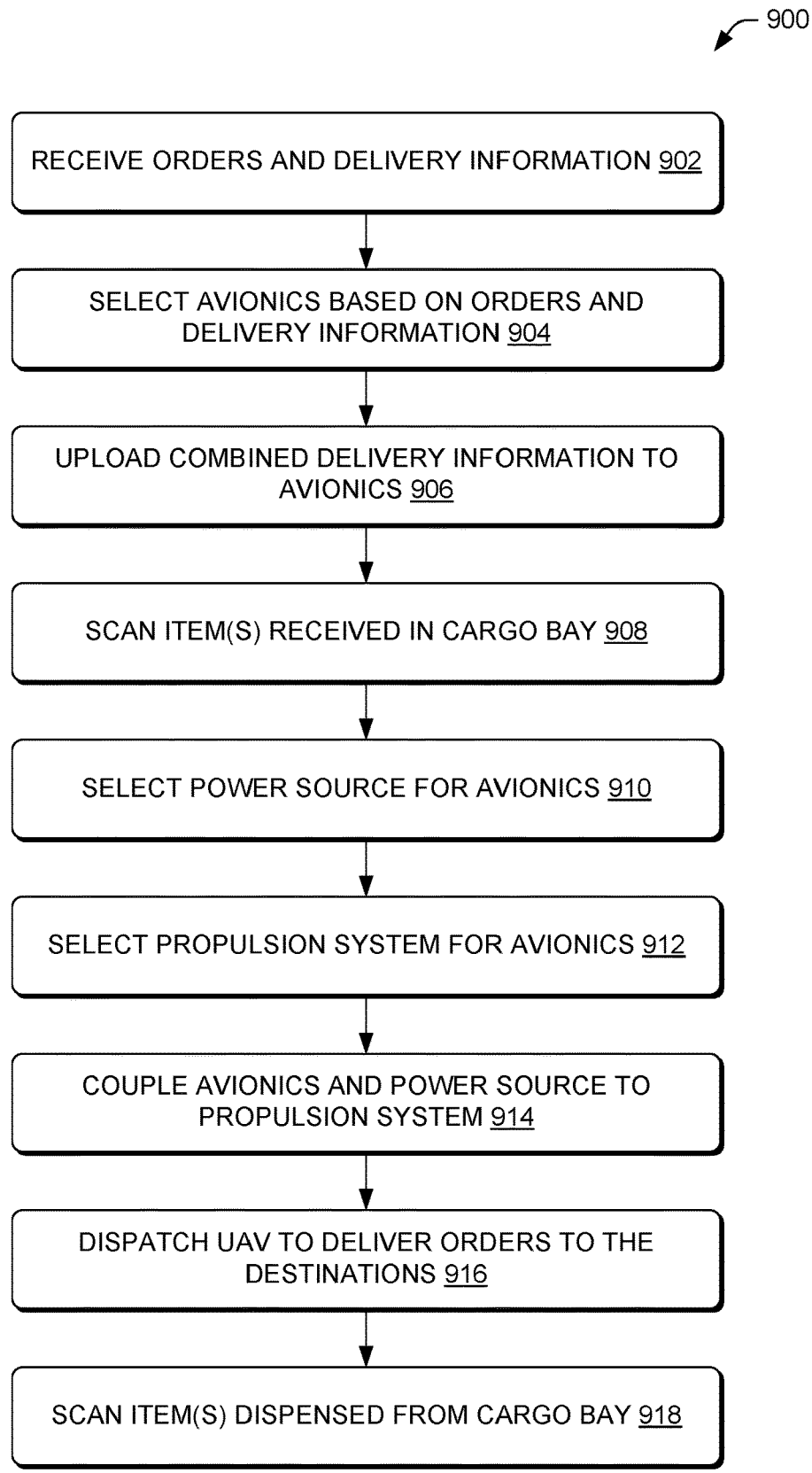
FIG. 9 is a flow diagram of another illustrative process to configure a UAV with an illustrative avionic system prior to flight of the UAV.

FIG. 9 is a flow diagram of another illustrative process 900 to configure a UAV with an illustrative avionic system prior to flight of the UAV.

At 902, the fulfillment center may receive multiple orders for items, possibly from different customers. Some of the orders may be associated with delivery destinations that are along a common route, and thus may be associated and fulfilled by a same UAV during a flight plan that includes different legs or segments along the common route. These orders may be associated for fulfillment by a same flight plan. Thus, the flight plan may be created to accommodate fulfillment of the orders that have the common route.

At 904, avionics may be selected from available different avionics based on the flight plan and delivery information determined at the operation 902. In some embodiments, the avionics may include a cargo bay to contain the orders and dispense each order (e.g., item or items) at a particular location during a flight. For example, the avionics may be similar to the avionics 400 shown in FIG. 4A, which includes the cargo bay 410.

At 906, the combined delivery information for the orders may be uploaded to the selected avionics to ready the avionics to perform the different legs of the flight plan. The avionics may be readied by uploading data, such as control data, inventory data, address information, a sequence of deliveries, weather information, payload information, and/or other relevant information. The avionics may also be readied by charging an internal battery of the avionics and/or performing other services on the avionics, such as inspections, cleaning, etc.

At 908, items and/or packages provided to the cargo bay may be scanned or otherwise logged for tracking purposes and/or other purposes. For example, as items are placed in the cargo bay, the items may be identified and verified as correct to fulfill the orders. The items/packages may be placed in the cargo bay using a first-in, last-out technique to prepare the items for deposit during the flight of the UAV at the correct destinations. In some embodiments, a location within the cargo bay may be associated with an item/package to enable the avionics to selectively release the item/package while retaining other items/packages in the cargo bay. For example, the cargo bay may include multiple bays each having different doors, or a door may open different amounts to enable depositing items/packages from different portions of the cargo bay. In some embodiments, a door may open to a first position to release a first item while retaining a second item. The door may then open to a second position to release the second item, and so forth.

At 910, the power source for the UAV may be selected to power to UAV to complete the flight plan. For example, the power source may be a battery having a charged capacity to power the UAV to completion of the delivery and flight plan. In some embodiments, the charge of the battery may include a safety factor to provide more power capacity to the UAV than expected in case a need for more power arises, such as due to stronger than expected headwinds, object avoidance, and/or other unexpected events that cause the UAV to consume more power than expected.

At 912, the propulsion system may be selected to propel the UAV to complete the flight plan. The propulsion system may be a type of rotor-craft, a forward flight aircraft, or a hybrid aircraft that include both hover and forward flight capabilities. The selection of the propulsion system may be based on a distance of the deliveries, a size and weight of the payload, and/or other characteristics or attributes of the flight plan.

At 914, the UAV may be assembled by coupling the avionics, the power source, and the propulsion system together to form the UAV. The coupling may be performed as described with reference to FIGS. 5A and/or 6A. For example, the different components may couple together, such as by snaps that selectively lock the components together. Some components may be inserted into cavities in other components, which may or may not be closed behind doors. As discussed above, assembly may be performed in stages, such as along an assembly line or in batches as orders are processed, for example.

At 916, the UAV may be dispatched just after assembly of the UAV to deliver the items/packages to the appropriate destinations. Thus, a customized UAV having components specifically selected for the flight plan and delivery may be assembled and dispatched to execute the flight plan and perform the deliveries.

At 918, the avionics may scan or otherwise identify items/packages as the items/packages are dispensed from the cargo bay. For example, the cargo bay may deploy a radio frequency identifier (RFID) radio that can read RFID tags on items/packages to determine which items/packages are present in the cargo bay at a given time and which items/packages have been dispensed from the cargo bay. Other inventory techniques may be used, such as scanning image codes on the items/packages, and so forth. By performing the operations 908 and 918, the avionics may create a complete log of the deliveries that may be later reference to verify completion of a delivery, among other possible uses of this data.

Figure 10:
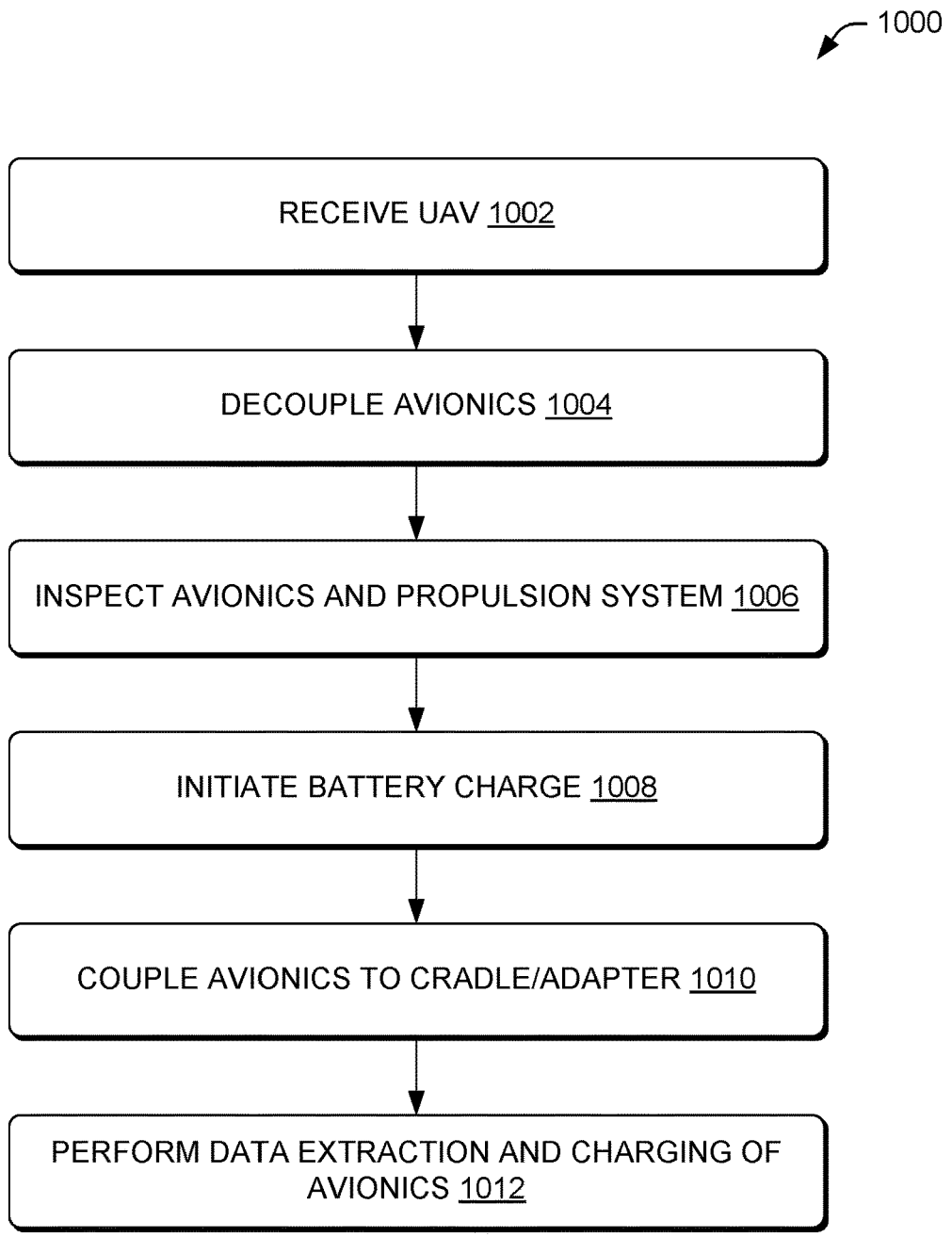
FIG. 10 is a flow diagram of an illustrative process to receive a UAV with an illustrative avionic system after flight of the UAV.

FIG. 10 is a flow diagram of an illustrative process 1000 to receive a UAV with an illustrative swappable avionic system after flight of the UAV. The process 1000 may occur after the UAV performs a delivery following performance of the process 800 or the process 900 described above.

At 1002, the UAV may be received at the fulfillment center, at a service center, or at another location. In some embodiments, the UAV may be received by a mobile platform, such as a land vehicle that collects the UAV after the UAV preforms an intended flight plan or a portion of the flight plan.

At 1004, the avionics may be decoupled from the UAV. For example, the avionics may unlock a coupling device by toggling the coupling device into an unlocked position in response to a signal and/or in response to security information. In some embodiments, the avionics may be ejected or otherwise made removable such as in response to receipt of a wireless signal received from a known or secure location. In various embodiments, the avionics may be decoupled in response to movement of a mechanical switch or other mechanical device, possibly using a key or other security device to cause the decoupling.

At 1006, the avionics may be physically inspected to determine if the battery shows any signs of damage or wear. If the physical inspection reveals any damage or problems with the avionics, then the avionics may be sent to service for further inspection as discussed below. At 1006, the propulsion system may also be inspected to determine if the battery shows any signs of damage or wear. Following the inspection, the avionics may be subject to further processing as discussed below. The propulsion system may be logged as available, assuming the inspection does not warrant performance of additional service. The propulsion system may be stowed in a designated location and made available for use in a subsequent custom configured UAV.

At 1008, the battery may be coupled to a power source to charge the battery. The battery may also be physically inspected to determine if the battery shows any signs of damage or wear. The battery charger may perform diagnostics on the battery to determine whether the battery is charging and discharging in accordance with design specifications. If the battery shows signs of physical damage or does not charge or discharge in accordance with design specifications, the battery may be serviced or discontinued from use.

At 1010, the avionics may be coupled to a cradle or other adapter to enable extraction of data from the avionics, perform operational tests on the avionics, and/or charge an avionics battery of the avionics. In addition, the avionics may be prepared for a subsequent deployment by uploading data to the avionics, such as a flight plan and/or other information via the cradle/adapter.

At 1012, the data may be extracted from the avionics. The data may be analyzed to determine a health of the avionics, a health of other components of the UAV previously configured for the flight plan, and/or for other reasons. In some embodiments, analysis of the data may result in a determination that the avionics need service, such as when the avionics data reveals operation outside of operational thresholds (e.g., excessive heat buildup during operation, impact or other excessive vibration recorded by an accelerometer, and so forth). The avionics may be serviced as a result of a number of cycles or deployments of the avionics, such as a standard intervals or other designated times or cycle counts. When the avionics is not serviced, the avionics may be logged as available, assuming the inspection does not warrant performance of additional service. The avionics may be stowed in a designated location and made available for use in a subsequent custom configured UAV.

Figure 11:
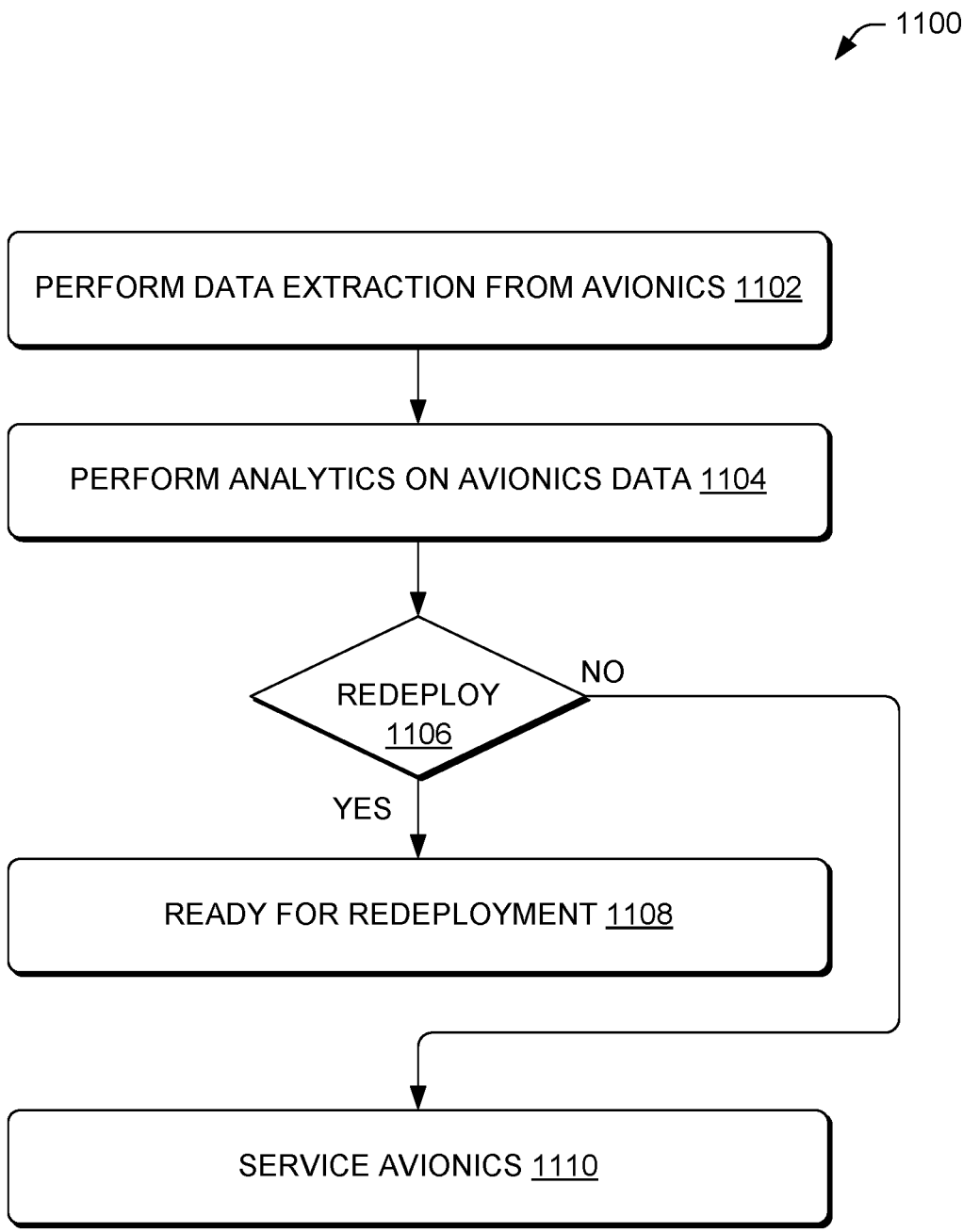
FIG. 11 is a flow diagram of an illustrative process to extract data from avionics after a flight of the UAV.

FIG. 11 is a flow diagram of an illustrative process 1100 to extract data from avionics after a flight of the UAV. The process 1100 may be performed as part of the operation 1012 shown in FIG. 10.

At 1102, data may be extracted from the avionics. The data may be extracted by a wired connection, such as by connecting to the avionics through a wired port or docking connection via a wire, a cradle, or an adapter. In some embodiments, the data may be extracted via a wireless connection, such as via a Wi-Fi connection, a Bluetooth® connection, or using other wireless protocols. In still further embodiments, the data may be extracted using a mobile telephone network radio, which may access data prior to return of the avionics, such as while the avionics are in use and in flight and/or may access the data after the flight. The data may include logged data, operational data, system health data, performance data, and/or other data stored by the various components of the avionics. In some embodiments, the data may be raw data that may be unprocessed, and thus provide little value until analyzed using additional processing. For example, some data may include time stamps and position coordinates, which may be used to determine velocity, trajectory, etc. of the UAV when processed to calculate such information.

At 1104, the extracted data, or a portion thereof, may undergo analysis. For example, one or more computing systems may perform analytics on the extracted data to determine information, such as threshold operating conditions, operational parameters, and/or other summary or high level data results. The analytics may reveal whether the operation of the avionics and/or operation of the UAV was within or outside of expected ranges of operation, including location, speed, operating temperature, and/or other metrics. In some embodiments, the resulting data may indicate forces exerted on the avionics due to vibration, collisions, or other events resulting in forces applied to the avionics or the UAV. One or many possible results of the analysis of the analytics is to determine whether the avionics (or other components of the UAV) are available for redeployment without repair or special service (other than routine service performed for most or all cycles of use, such as cleaning, clearing memory, etc.).

At 1106, a redeployment decision may be made and/or obtained based on the analysis of the analytics. For example, the avionics may not be redeployed if the analytics indicate operation of avionics or the UAV was outside of threshold ranges for values and/or if the avionics and/or the UAV experienced unusual events and/or operational behavior (e.g., was off an expected course, impacted an objected, missed a delivery, and so forth). When operation is within threshold ranges and no unusual or unplanned events occur (following the "yes" route from the decision operation 1106), then the process 1100 may advance to an operation 1108.

At 1108, the avionics (and/or other components) may be readied for redeployment without repair or special service. For example, the avionics may have some memory cleared or marked as available for write operations. An avionics battery may be charged for a next use. The avionics memory may be loaded with a next flight plan and other relevant information for a next use. For example, current weather information, cargo information, and/or other relevant information may be loaded in memory of the avionics as the avionics are readied for a subsequent use. In some embodiments, some of these tasks may not be performed until the avionics is selected for a next use.

Returning to the decision operation 1106, when the data indicates operation is outside threshold ranges and/or unusual or unplanned events occur (following the "no" route from the decision operation 1106), then the process 1100 may advance to an operation 1110. At 1110, the avionics (and/or other components) may be designated for special service, such as to inspect or repair the avionics and/or other components, to perform further testing, and/or for possible retirement.

Figure 12:
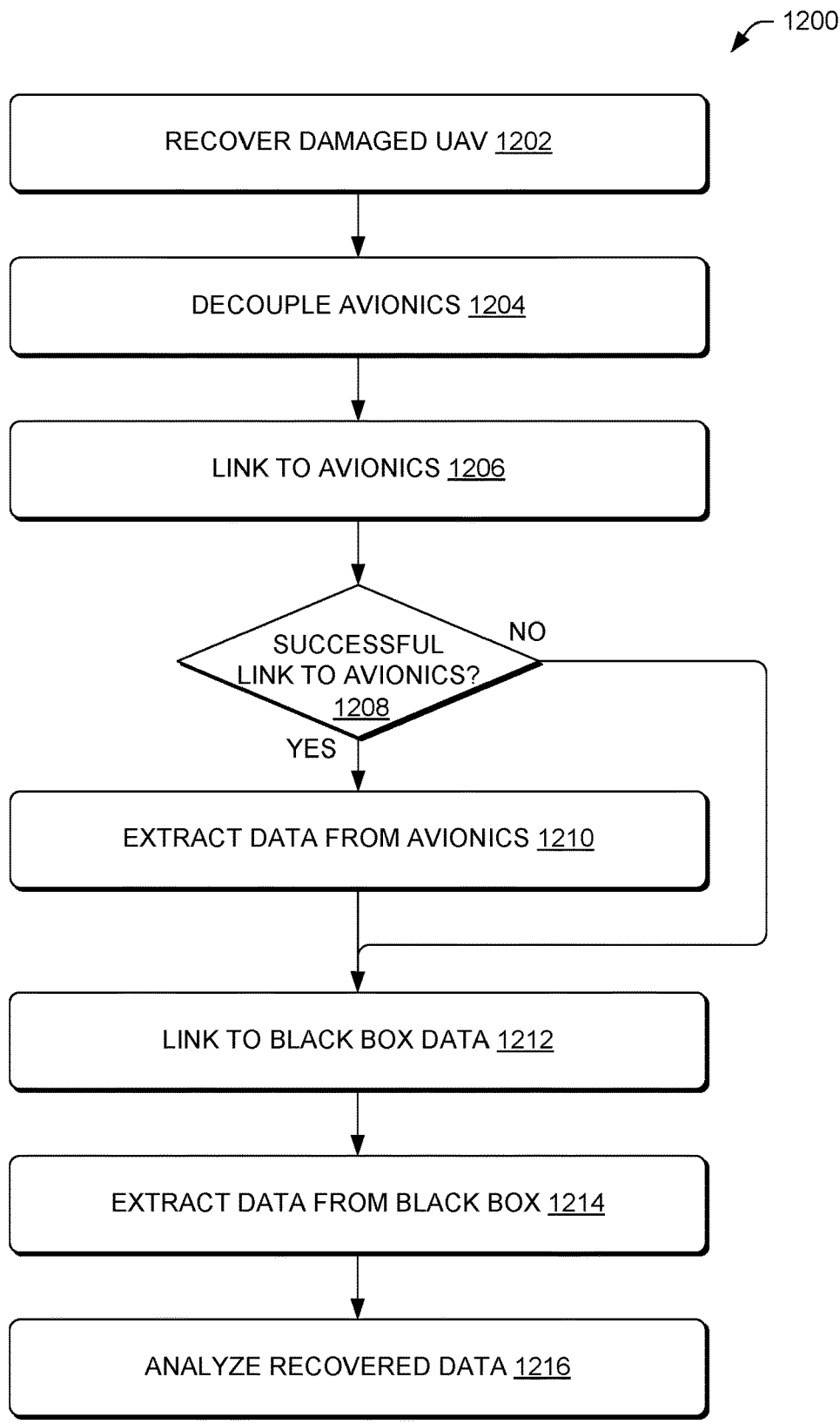
FIG. 12 is a flow diagram of an illustrative process to extract data from avionics after recovery of a damaged UAV.

FIG. 12 is a flow diagram of an illustrative process 1200 to extract data from avionics after recovery of a damaged UAV. The process 1200 may extract data from a black box onboard the avionics, for example, such as the black box 334 shown in FIG. 3.

At 1202, the avionics may be recovered from a damaged UAV. For example, the avionics may be recovered from a UAV that did not successfully complete a delivery, crashed, or returned from a delivery in a damaged state. The damage may be to the avionics, the propulsion system, the battery, the container (or cargo bay), and/or to another component of the UAV, such as to sensors or other parts. In various embodiments, the avionics may be located by tracking a beacon emitted from a black box in the avionics, such as when the UAV crashes and does not return to a known location. The beacon may be a powered beacon or a passive beacon (e.g., RFID, etc.).

At 1204, the avionics may be decoupled from the UAV. In some embodiments, when typical operation is not possible (e.g., inability to release avionics using normal mode of release, etc.), then the avionics may be removed using alternative techniques, such as by physical extraction of the avionics, removal or destruction of other components, or the like. In some embodiments, the avionics may remain coupled to at least one other component if decoupling is not possible without causing further damage or if decoupling is impractical.

At 1206, a data link may be established with the avionics to extract data from the avionics. The data link may be via a physical connector such as a cable, an adapter, or a cradle. In some embodiments, the data link may be established by a wireless communication, such as a Wi-Fi connection, a Bluetooth® connection, and/or a mobile telephone radio connection.

At 1208, a determination may be made as to whether the data link to the avionics is successful at extracting meaningful data from memory of the avionics. For example, connectors, radios, and/or other interfaces may be damaged and may prevent extraction or linking to the avionics. When a data link is successful with the avionics (following the "yes" route from the decision operation 1208), then the process 1200 may advance to an operation 1210 for further processing.

At 1210, data may be extracted from the avionics using the established data link. The extracted data may be extracted from standard memory (e.g., the data 318 shown in FIG. 3) of the avionics.

When the data link is unsuccessful with the avionics (following the "no" route from the decision operation 1208) or following the operation 1210, the process 1200 may advance to an operation 1212 for further processing. At 1212, a data link may be established with a black box (e.g., the black box 334 shown in FIG. 3), such as a black box data recorder present in the avionics when such a device is present. The data link with the black box may be made via a physical connector such as a cable, an adapter, or a cradle. In some embodiments, the data link may be established by a wireless communication, such as a Wi-Fi connection, a Bluetooth® connection, and/or a mobile telephone radio connection. In various embodiments, the data link with the black box may be made via RFID or other alternative communication protocols to extract at least rudimentary data from memory in the black box.

At 1214, data may be extracted from the black box. The data stored in the black box may be redundant data as at least some data stored in the main or primary memory of the avionics, or may be different data used for special purposes, such as for analyzing a fault or crash, capturing rudimentary motion data and other basic operational parameters, or capturing other types of data that is helpful in analyzing a crash or fault experienced by the avionics and/or by the UAV. In some embodiments, the black box may be extracted from the avionics in order to extract data from the avionics.

At 1216, the data extracted from the black box may be analyzed to make determinations about events prior to the damage to the UAV and/or avionics, such as events that lead to the damage. The data may indicate operational parameters of the UAV, location data, temperature, environmental conditions, speed, vibrational or force data (e.g., from accelerometers), and/or other data. This data may be used to prevent future occurrences of the damage, among other possible uses.

In some embodiments, the avionics may output information using a display (e.g., liquid crystal display (LCD), or other display), via lights such as LEDs, and/or by other outputs. For example, the avionics may output error codes and/or other information that may indicate a state of the avionics, the UAV, or a state of other components. Additionally, it should be understood by those having ordinary skill, that the terms "coupled," "coupling," and "couple," as used herein, may include mechanical, electrical, optical, hydraulic, pneumatic, or any other type of coupling mechanism appropriate for the types of devices and components to be coupled.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
    a propulsion system comprising:
        a propulsion frame;
        a plurality of propulsion units coupled to the propulsion frame, each propulsion unit of the plurality of propulsion units including a rotor, a speed controller, and a motor; and
        a propulsion port to provide at least one of power or control data to the plurality of propulsion units;
    a detachable avionics system comprising:
        an avionics frame;
        a housing to enclose avionics components within the avionics frame;
        a propulsion coupling feature to selectively couple to the propulsion system, the propulsion coupling feature to toggle between a first position that engages the propulsion system and a second position that is free from engaging the propulsion system;
        an avionics port including at least a data port and a power port, the avionics port to couple to the propulsion port of the propulsion system to provide the at least one of the power or the control data;
    a battery coupled to at least one of the detachable avionics system or the propulsion system, the battery to provide power to the avionics port;
    a cargo bay that includes a door and that is coupled to at least one of the detachable avionics system or the propulsion system, the cargo bay configured to transport and selectively release packages from the UAV; and
    control logic to selectively open the door to deposit the packages from the cargo bay at specific locations during a flight to be traversed by the UAV.

2. The UAV as recited in claim 1, wherein the avionics components comprise:
    an attitude control device;
    a navigation control device;
    a computer vision device;
    a health monitoring device;
    a radio; and
    a data logging device.

3. The UAV as recited in claim 1, wherein the propulsion system includes a cavity, and wherein the avionics system couples within the cavity of the propulsion system, and wherein the avionics port couples to the propulsion port of the propulsion system when the avionics system is seated in the cavity of the propulsion system.

4. The UAV as recited in claim 1, wherein the avionics system includes a cargo bay coupling feature to selectively couple the cargo bay to the avionics system, and wherein the avionics system controls operation of the cargo bay via at least one of a data connection, a power connection, or a mechanical connection.

5. The UAV as recited in claim 1, wherein the housing includes a plurality of fins coupled to an exterior of the housing and an aperture through the avionics system to remove heat from an interior of the housing.

6. An avionics device comprising:
    a frame;
    a housing, the housing at least partially enclosing interior avionics components within the frame;
    a plurality of fins coupled to an exterior of the housing to dissipate heat from an interior of the housing;
    a first coupling feature to selectively couple the avionics device to a propulsion system to form an unmanned aerial vehicle (UAV); and
    a first data interface configured to couple to at least a corresponding second data interface of the propulsion system,
    wherein the housing forms a fuselage of the UAV after assembly of the UAV.

7. The avionics device as recited in claim 6, wherein the interior avionics components include at least a data logging device to store data collected during performance of a flight plan by the UAV, and wherein the first data interface is configured to output the data from the logging device.

8. The avionics device as recited in claim 6, further comprising a second coupling feature to selectively couple to a package, the second coupling feature configured to be actuated by the avionics device to uncouple the package at or above a delivery destination.

9. The avionics device as recited in claim 6, further comprising at least one external sensor coupled to the avionics device to capture environmental data, the at least one external sensor including at least one of a pitot tube or a camera.

10. The avionics device as recited in claim 6, wherein the internal avionics components include a temperature sensor to monitor internal temperature of the avionics device.

11. The avionics device as recited in claim 6, further comprising an aperture that projects at least partially within a volume of the avionics device to dissipate heat from the avionics device.

12. The avionics device as recited in claim 6, wherein the frame is configured as an airframe to support the propulsion system comprising multiple propulsion units.

13. The avionics device as recited in claim 6, further comprising a black box data recorder to log at least some flight data during operation of the UAV, the black box data recorder located inside of the housing and including a protective layer that at least partially surrounds the black box data recorder.

14. The avionics device as recited in claim 6, further comprising a locking mechanism to lock the first coupling to secure the propulsion system to the avionics device, and to unlock, in response to a key or data signal, to enable decoupling of the avionics device from the propulsion system.

15. The avionics device as recited in claim 6, further comprising:
 a cargo bay that includes a door; and
 control logic to selectively open the door to deposit one or more items from the cargo bay at one or more specific locations during a flight to be traversed by the UAV.

16. A system comprising:
 a propulsion component comprising:
  a plurality of propulsion units, individual propulsion units of the plurality of propulsion units including a rotor and a motor; and
  a propulsion port to provide at least one of power or control data to the plurality of propulsion units;
 a detachable avionics device comprising:
  a frame;
  a housing to at least partially enclose avionics components within the frame;
  a propulsion coupling feature to selectively couple to the propulsion component; and
  an avionics port including at least a data port and a power port, the avionics port to couple to the propulsion port of the propulsion component to provide the at least one of the power or the control data; and
 a battery coupled to at least one of the detachable avionics device or the propulsion component, the battery to provide power to the avionics port,
 wherein the propulsion component and the detachable avionics device form an unmanned aerial vehicle (UAV) and the housing forms a fuselage of the UAV after assembly of the UAV.

17. The system as recited in claim 16, wherein the propulsion coupling feature is configured to toggle between a first position that engages the propulsion component and a second position that is free from engaging the propulsion component.

18. The system as recited in claim 16, wherein the avionics device includes at least one of a radio specified for communications in a predetermined region or an image sensor configured to record imagery in certain environmental conditions.

19. The system as recited in claim 16, wherein the avionics device includes a cargo bay that includes a door, the avionics device including control logic to selectively open the door to deposit items from the cargo bay at specific locations during a flight.

20. The system as recited in claim 16, further comprising a container coupler to couple an item for delivery to the avionics device, the avionics device configured to selectively decouple the container coupler to deposit the item at or above a delivery destination.

\* \* \* \* \*